US011799590B2

(12) United States Patent
Akkarakaran et al.

(10) Patent No.: US 11,799,590 B2
(45) Date of Patent: Oct. 24, 2023

(54) HYBRID AUTOMATIC REPEAT REQUEST PROCEDURES FOR A RELAY USING PARTIAL DECODING

(71) Applicant: QUALCOMM Incorporated, San Diego, CA (US)

(72) Inventors: Sony Akkarakaran, Poway, CA (US); Tao Luo, San Diego, CA (US); Junyi Li, Franklin Park, NJ (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 17/249,858

(22) Filed: Mar. 16, 2021

(65) Prior Publication Data
US 2021/0336723 A1 Oct. 28, 2021

Related U.S. Application Data

(60) Provisional application No. 63/016,026, filed on Apr. 27, 2020.

(51) Int. Cl.
| *H04L 1/1812* | (2023.01) |
| *H04L 5/00* | (2006.01) |
| *H04L 1/1829* | (2023.01) |
| *H04L 1/1867* | (2023.01) |
| *H04B 7/155* | (2006.01) |

(52) U.S. Cl.
CPC ........... *H04L 1/1812* (2013.01); *H04B 7/155* (2013.01); *H04L 1/1829* (2013.01); *H04L 1/1896* (2013.01); *H04L 5/0055* (2013.01)

(58) Field of Classification Search
CPC ... H04L 1/1812; H04L 1/1829; H04L 1/1896; H04L 5/0055; H04L 2001/0097; H04L 65/1016; H04L 1/1822; H04L 1/1845; H04L 1/1854; H04L 1/0057; H04L 1/0052; H04B 7/155
See application file for complete search history.

(56) References Cited

U.S. PATENT DOCUMENTS

| 2015/0201366 A1 | 7/2015 | Lim et al. | |
| 2016/0269164 A1* | 9/2016 | Jiang | H04L 1/0035 |
| 2017/0195014 A1* | 7/2017 | Kim | H04B 7/0413 |
| 2019/0165807 A1* | 5/2019 | Wang | H03M 13/091 |
| 2019/0238212 A1* | 8/2019 | Kalhan | H04W 52/48 |

(Continued)

FOREIGN PATENT DOCUMENTS

WO 2014098720 A1 6/2014

OTHER PUBLICATIONS

International Search Report and Written Opinion—PCT/US2021/070279—ISA/EPO—dated Jun. 1, 2021.

*Primary Examiner* — Abdullahi Ahmed
(74) *Attorney, Agent, or Firm* — Harrity & Harrity, LLP

(57) ABSTRACT

Various aspects of the present disclosure generally relate to wireless communication. In some aspects, a wireless node may receive, from a first wireless node, data that is for a second wireless node; transmit, to the second wireless node, a packet that contains information associated with partial decoding of the data; and receive, from the second wireless node, at least one of first acknowledgment or negative acknowledgement (ACK/NACK) feedback for the packet or second ACK/NACK feedback for the data. Numerous other aspects are provided.

30 Claims, 14 Drawing Sheets

(56) References Cited

U.S. PATENT DOCUMENTS

| | | | |
|---|---|---|---|
| 2019/0334662 A1* | 10/2019 | Fröberg Olsson et al. | ............... H04L 1/1854 |
| 2020/0229179 A1* | 7/2020 | Fan | ............... H04L 1/1864 |
| 2020/0374040 A1* | 11/2020 | Lou | ............... H04L 1/1614 |
| 2021/0135791 A1* | 5/2021 | Wang | ............... H04L 1/0009 |
| 2021/0176011 A1* | 6/2021 | Lei | ............... H04W 72/042 |

\* cited by examiner

HYBRID AUTOMATIC REPEAT REQUEST PROCEDURES FOR A RELAY USING PARTIAL DECODING

CROSS-REFERENCE TO RELATED APPLICATION

This Patent Application claims priority to U.S. Provisional Patent Application No. 63/016,026, filed on Apr. 27, 2020, entitled "HYBRID AUTOMATIC REPEAT REQUEST (HARQ) PROCEDURES FOR A RELAY USING PARTIAL DECODING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for hybrid automatic repeat request (HARQ) procedures for a relay using partial decoding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless node, may include receiving, from a first wireless node, data that is for a second wireless node; transmitting, to the second wireless node, a packet that contains information associated with partial decoding of the data; and receiving, from the second wireless node, at least one of first acknowledgment or negative acknowledgment (ACK/NACK) feedback for the packet or second ACK/NACK feedback for the data.

In some aspects, a method of wireless communication, performed by a wireless node, may include receiving, from a first wireless node, a packet that contains information associated with partial decoding of data transmitted to the first wireless node by a second wireless node; and transmitting, to the first wireless node, at least one of first ACK/NACK feedback for the packet or second ACK/NACK feedback for the data.

In some aspects, a wireless node for wireless communication may include a memory and one or more processors coupled to the memory. The memory and the one or more processors may be configured to receive, from a first wireless node, data that is for a second wireless node; transmit, to the second wireless node, a packet that contains information associated with partial decoding of the data; and receive, from the second wireless node, at least one of first ACK/NACK feedback for the packet or second ACK/NACK feedback for the data.

In some aspects, a wireless node for wireless communication may include a memory and one or more processors coupled to the memory. The memory and the one or more processors may be configured to receive, from a first wireless node, a packet that contains information associated with partial decoding of data transmitted to the first wireless node by a second wireless node; and transmit, to the first wireless node, at least one of first ACK/NACK feedback for the packet or second ACK/NACK feedback for the data.

In some aspects, a non-transitory computer-readable medium may store one or more instructions for wireless communication. The one or more instructions, when executed by one or more processors of a wireless node, may cause the one or more processors to receive, from a first wireless node, data that is for a second wireless node; transmit, to the second wireless node, a packet that contains information associated with partial decoding of the data; and receive, from the second wireless node, at least one of first ACK/NACK feedback for the packet or second ACK/NACK feedback for the data.

In some aspects, a non-transitory computer-readable medium may store one or more instructions for wireless communication. The one or more instructions, when executed by one or more processors of a wireless node, may cause the one or more processors to receive, from a first wireless node, a packet that contains information associated with partial decoding of data transmitted to the first wireless node by a second wireless node; and transmit, to the first wireless node, at least one of first ACK/NACK feedback for the packet or second ACK/NACK feedback for the data.

In some aspects, an apparatus for wireless communication may include means for receiving, from a first wireless node, data that is for a second wireless node; means for transmitting, to the second wireless node, a packet that contains information associated with partial decoding of the data; and means for receiving, from the second wireless node, at least one of first ACK/NACK feedback for the packet or second ACK/NACK feedback for the data.

In some aspects, an apparatus for wireless communication may include means for receiving, from a first wireless node, a packet that contains information associated with partial decoding of data transmitted to the first wireless node by a second wireless node; and means for transmitting, to the first wireless node, at least one of first ACK/NACK feedback for the packet or second ACK/NACK feedback for the data.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
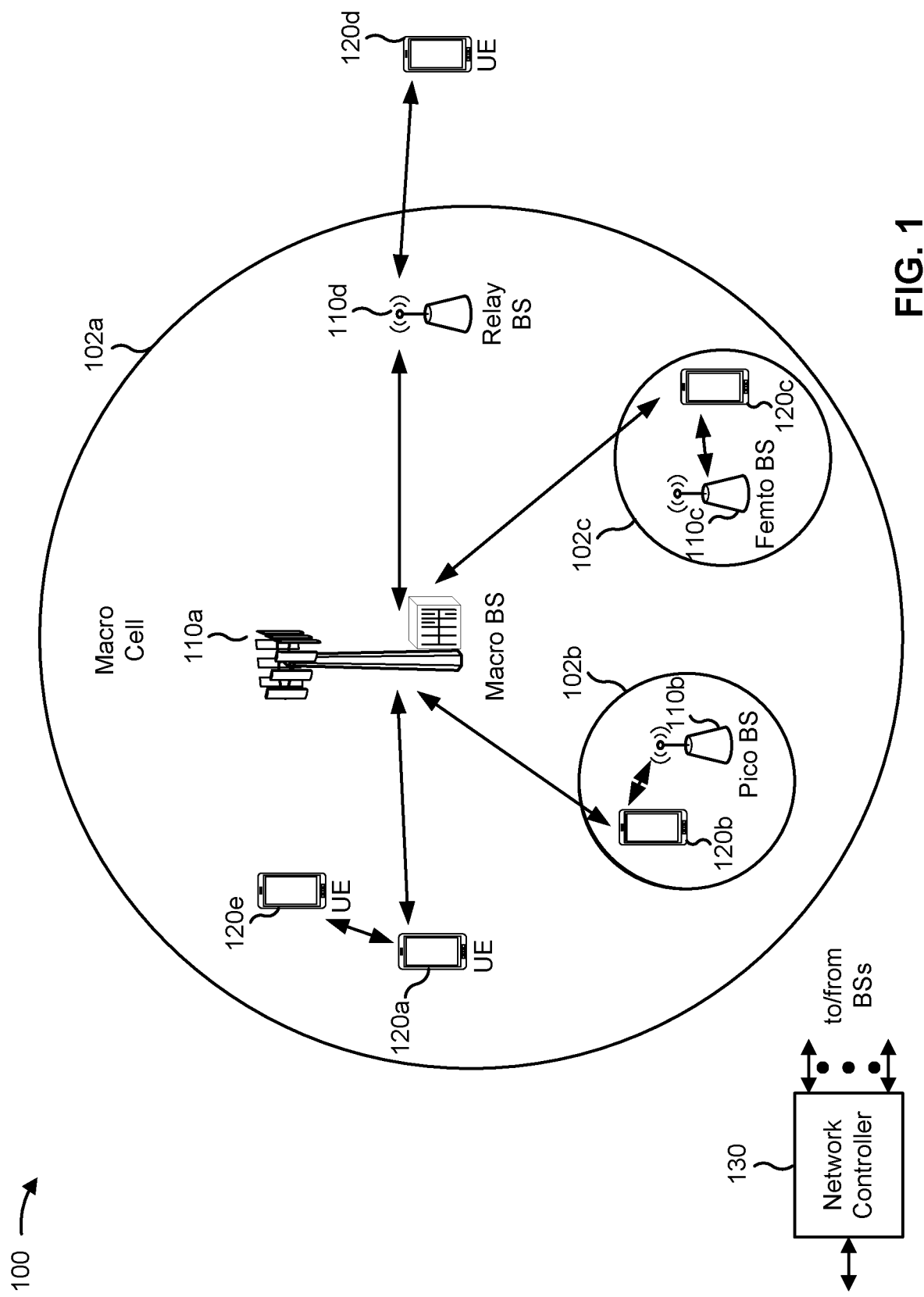
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a wireless node (e.g., a relay, a BS 110, a UE 120, and/or the like) may perform partial decoding of data that the wireless node is to forward to another wireless node (e.g., a BS 110, a UE 120, and/or the like). In such cases, the wireless node may transmit information associated with the partial decoding to enable the other wireless node to decode the data using the information. This may increase the speed at which the wireless node performs relaying, as well as increase the speed at which the other wireless node decodes the data. In some cases, a performance of communications relayed by the wireless node may be improved when the other wireless node reports acknowledgment (ACK) or negative acknowledgment (NACK) feedback for the relayed communications.

As indicated above, FIG. 1 is provided as an example. Other examples may differ from what is described with regard to FIG. 1.

Figure 2:
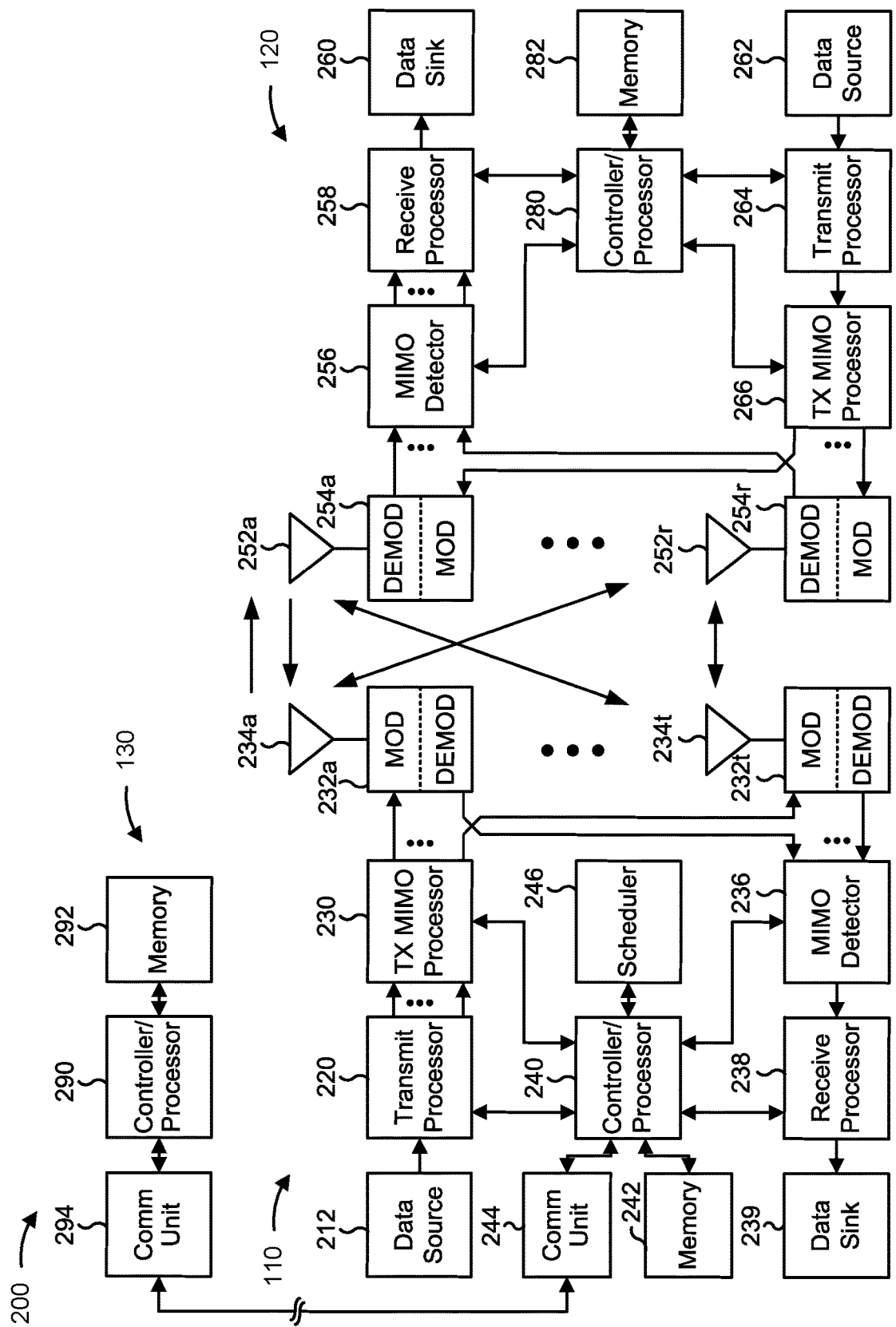
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with HARQ procedures for a relay using partial decoding, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a wireless node (e.g., a BS 110, UE 120, and/or the like) may include means for receiving, from a first wireless node, data that is for a second wireless node, means for transmitting, to the second wireless node, a packet that contains information associated with partial decoding of the data, means for receiving, from the second wireless node, at least one of first ACK or NACK (ACK/NACK) feedback for the packet or second ACK/NACK feedback for the data. In some aspects, a wireless node (e.g., a BS 110, UE 120, and/or the like) may include means for receiving, from a first wireless node, a packet that contains information associated with partial decoding of data transmitted to the first wireless node by a second wireless node, means for transmitting, to the first wireless node, at least one of first ACK/NACK feedback for the packet or second ACK/NACK feedback for the data, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
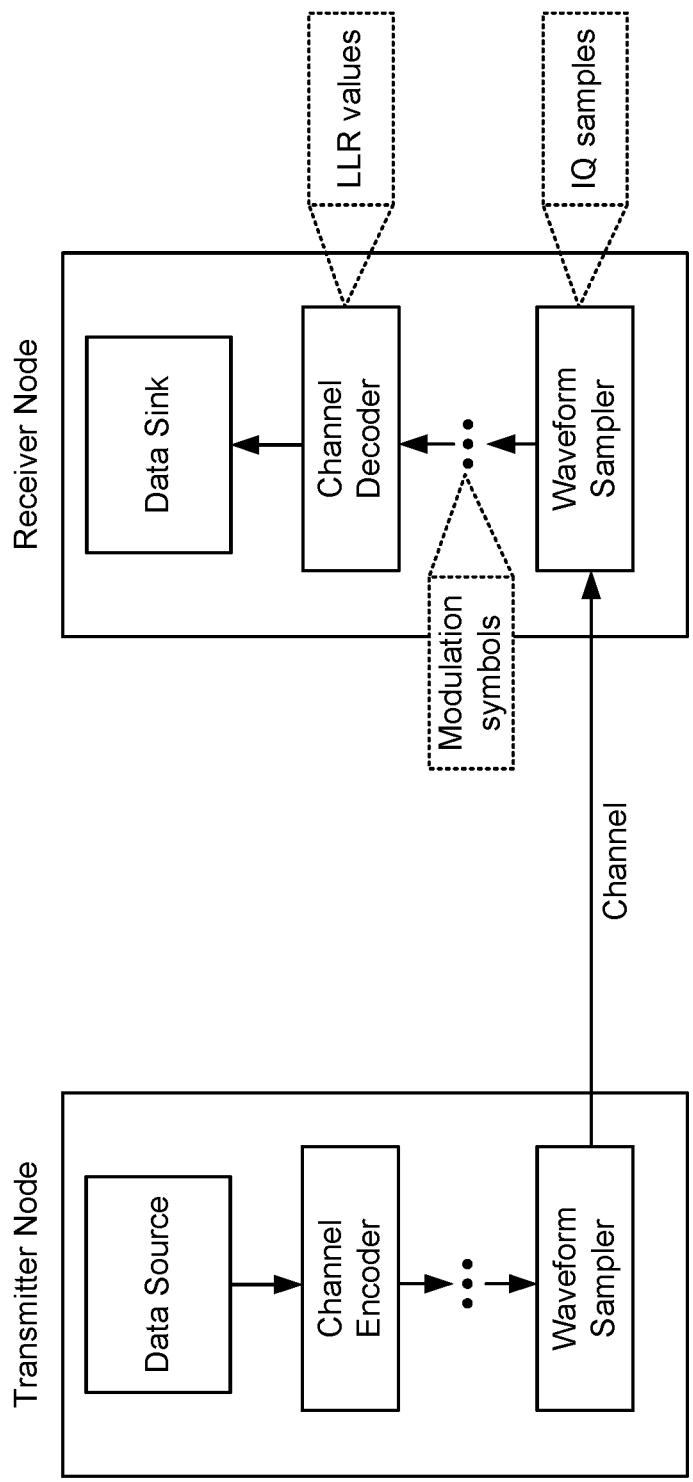
FIG. 3 is a diagram illustrating an example of communication in a wireless network, in accordance with the present disclosure.

FIG. 3 is a diagram illustrating an example 300 of communication in a wireless network (e.g., wireless network 100), in accordance with the present disclosure.

As shown in FIG. 3, a transmitter node (e.g., a wireless node) may include a plurality of components for encoding and transmitting a signal in the wireless network. For example, the transmitter node may include an encoder that includes a data source component, a channel encoder component, a waveform sampler component, and/or the like.

The data source component may provide data (e.g., data that is to be transmitted by the transmitter node). The channel encoder component may perform encoding of the data (e.g., according to a code scheme) to obtain code bits and/or parity bits. The transmitter node may map the code bits to modulation symbols (e.g., according to a modulation scheme). The waveform sampler component may process the modulation symbols to obtain a modulated signal (e.g., a waveform). The transmitter node may transmit the modulated signal to a receiver node (e.g., a wireless node) via a communication channel.

As shown in FIG. 3, the receiver node may include a plurality of components for receiving and decoding a signal in the wireless network. For example, the receiver node may include a decoder that includes a waveform sampler component, a channel decoder component, a data sink component, and/or the like.

The waveform sampler component may process the received signal. In some aspects, the waveform sampler component may process the received signal to obtain in-phase and quadrature (IQ) samples. In some aspects, the receiver node may obtain modulation symbols based at least in part on processing performed by the waveform sampler. The channel decoder component may process the modulation symbols to obtain the decoded data. For example, the channel decoder component may compute log likelihood ratio (LLR) values for the code bits based at least in part on the modulation symbols. An LLR value indicates a confidence level that a zero value or a one value was transmitted for a code bit. The data sink component may provide the decoded data to other components of the receiver node for processing.

In some aspects, the transmitter node may include one or more of the components described above in connection with the receiver node, and the receiver node may include one or more of the components described above in connection with the transmitter node. In some aspects, the transmitter node or the receiver node may be a BS 110, a UE 120, a relay, and/or the like.

As indicated above, FIG. 3 is provided as an example. Other examples may differ from what is described with respect to FIG. 3.

Figure 4:
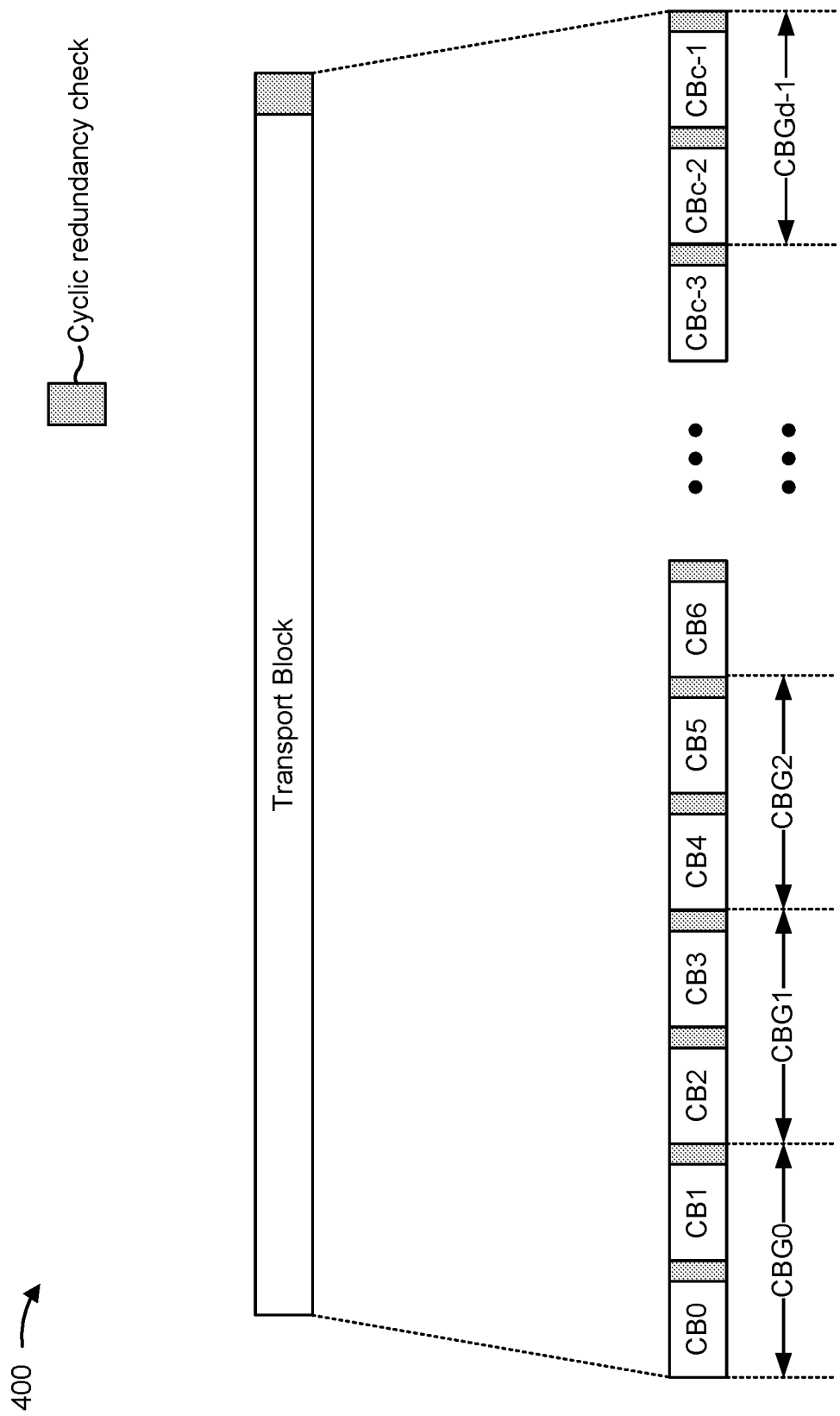
FIG. 4 is a diagram illustrating an example of code block (CB) groups (CBGs) of a transport block (TB), in accordance with the present disclosure.

FIG. 4 is a diagram illustrating an example 400 of code block (CB) groups (CBGs) of a transport block (TB), in accordance with the present disclosure. As shown in FIG. 4 a TB (e.g., a large TB) may be split into multiple CBs (e.g., FIG. 4 shows c CBs). In some cases, one or more CBs may be grouped into a CBG (e.g., FIG. 4 shows d CBGs). A size of a CBG (e.g., a quantity of CBs in a CBG) may be indicated in a radio resource control (RRC) message.

In some wireless networks (e.g., wireless networks using NR), a transmitter (e.g., a BS 110) may transmit data associated with a CBG (e.g., according to downlink control information (DCI) that indicates the CBG) to a receiver (e.g., a UE 120). The receiver may report ACK/NACK feedback for the CBG. In this case, the transmitter may retransmit data associated with the CBG when NACK feedback is reported.

As indicated above, FIG. 4 is provided as an example. Other examples may differ from what is described with respect to FIG. 4.

Figure 5:
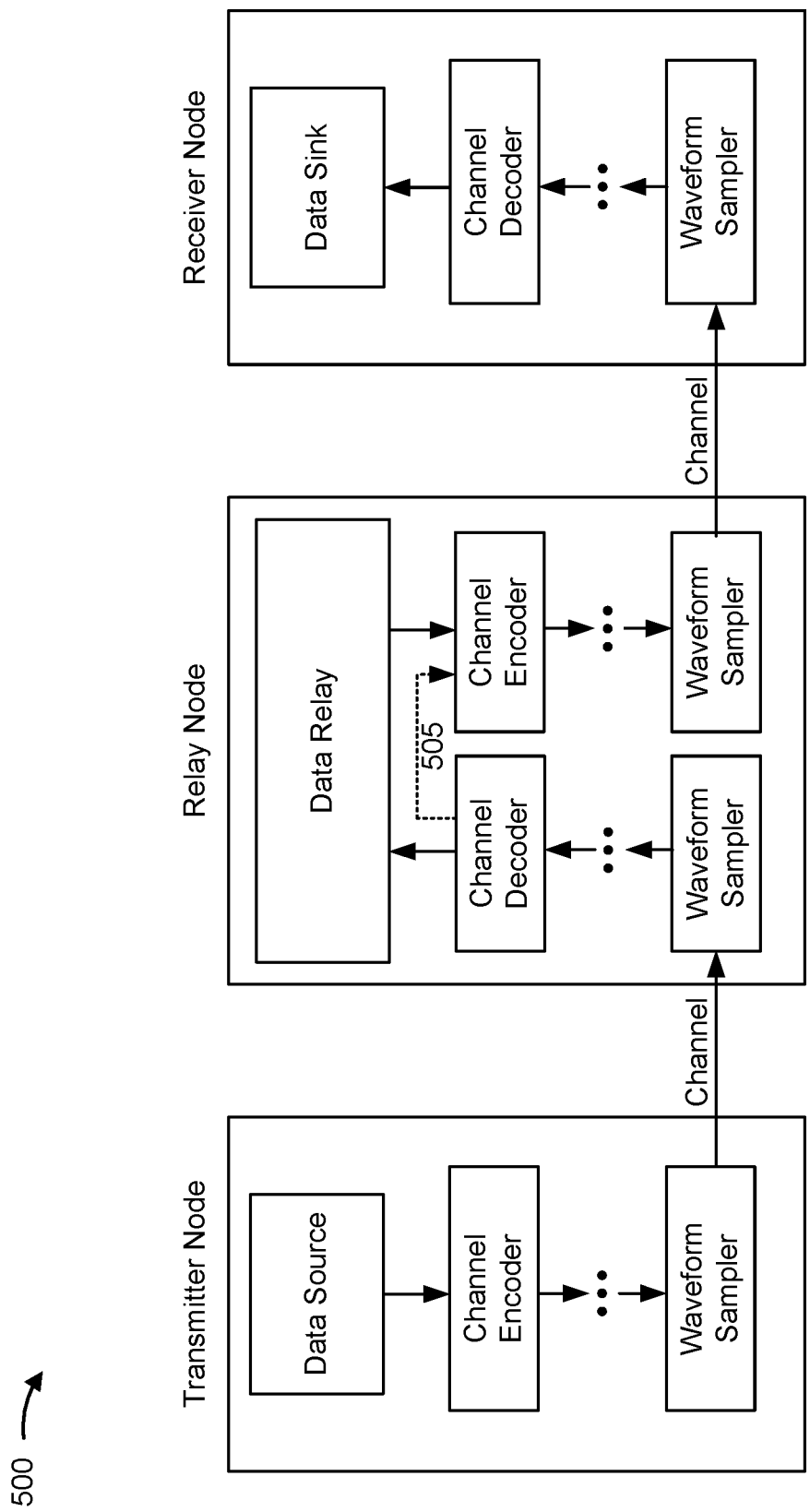
FIG. 5 is a diagram illustrating an example of communication in a wireless network via relay, in accordance with the present disclosure.

FIG. 5 is a diagram illustrating an example 500 of communication in a wireless network (e.g., wireless network 100) via relay, in accordance with the present disclosure.

As shown in FIG. 5, a transmitter node and a receiver node, as described in connection with FIG. 3, may communicate via a relay node (e.g., a wireless node). The relay node may include a decoder, as described in connection with FIG. 3, for decoding a signal received from the transmitter node, and an encoder, as described in connection with FIG. 3, for encoding a signal for transmission to the receiver node.

The relay node may extend coverage in the wireless network (e.g., if a direct link between the transmitter node and the receiver node is poor, the transmitter node and the receiver node may communicate via the relay instead). Moreover, the relay node may provide diversity, and improve robustness, of the wireless network (e.g., the transmitter node may communicate directly with the receiver node, and may communicate with the receiver node via the relay, such that if one of the paths fails the other path is available). In some aspects, the relay node may be associated with sidelink relaying (e.g., the relay node may be a UE), the relay node may be associated with integrated access and backhaul (IAB) relaying (e.g., the relay node may be an IAB node), and/or the like.

A relay may be classified as an analog relay or a decode-and-forward relay. An analog relay may receive a waveform (e.g., in a particular band) from a transmitter and may forward the waveform to a receiver without performing decoding and/or encoding (e.g., the analog relay may forward the waveform as-is). A decode-and-forward relay (e.g., which may include a receiver similar to a receiver used by the receiver node) may receive, from a transmitter, a waveform that encodes data, may decode the data, may re-encode the data, and may forward the re-encoded data to a receiver (e.g., in a manner used for 3GPP Release 16 IAB relaying). An analog relay and/or a decode-and-forward relay may perform forwarding at layer 1 (L1), layer 2 (L2), and/or layer 3 (L3), depending on an amount of processing that occurs at the relay between the relay's receive function and transmit function.

In some aspects, the relay node may perform an amount of processing of a received waveform that is between an amount of processing performed by an analog relay and an amount of processing performed by a decode-and-forward relay. For example, the relay node may perform partial decoding of data that is to be relayed. As an example, the relay node may perform some baseband processing, but may relay information to the receiver node before fully decoding data (e.g., prior to decoding).

For example, the relay node may forward IQ samples (e.g., samples of a waveform obtained during analog to digital conversion), forward modulation symbols (e.g., after an OFDM Fast Fourier Transform (FFT) and/or equalization), forward LLR values (e.g., input to a decoder of a channel code (e.g., a low density parity check (LDPC) decoder), or computed by intermediate operation of the decoder prior to packet decoding), and/or the like.

For example, as shown by reference number 505, when processing a received transmission, the relay node may not process the transmission with a channel decoder component (e.g., may skip running the decoder) or may process the transmission with the channel decoder component for a reduced quantity of iterations (e.g., relative to full decoding). As further shown by reference number 505, the relay node may encode (e.g., using a channel encoder component) a content of the channel decoder (e.g., a content resulting from no processing by the channel decoder or reduced processing by the channel decoder, such as LLR values), and transmit the encoded content to the receiver node. In this way, relaying latency may be reduced and/or decoding complexity may be reduced at the receiver node.

In some cases, a performance of communications relayed by the relay node may be improved when the receiver node reports ACK/NACK feedback for the relayed communications. However, wireless networks generally lack procedures to enable a receiver node to report ACK/NACK feedback to a relay node that performs partial decoding of data from a transmitter node. Some techniques and apparatuses described herein enable a receiver node to report ACK/NACK feedback to a relay node that performs partial decoding.

As indicated above, FIG. 5 is provided as an example. Other examples may differ from what is described with respect to FIG. 5.

Figure 6:
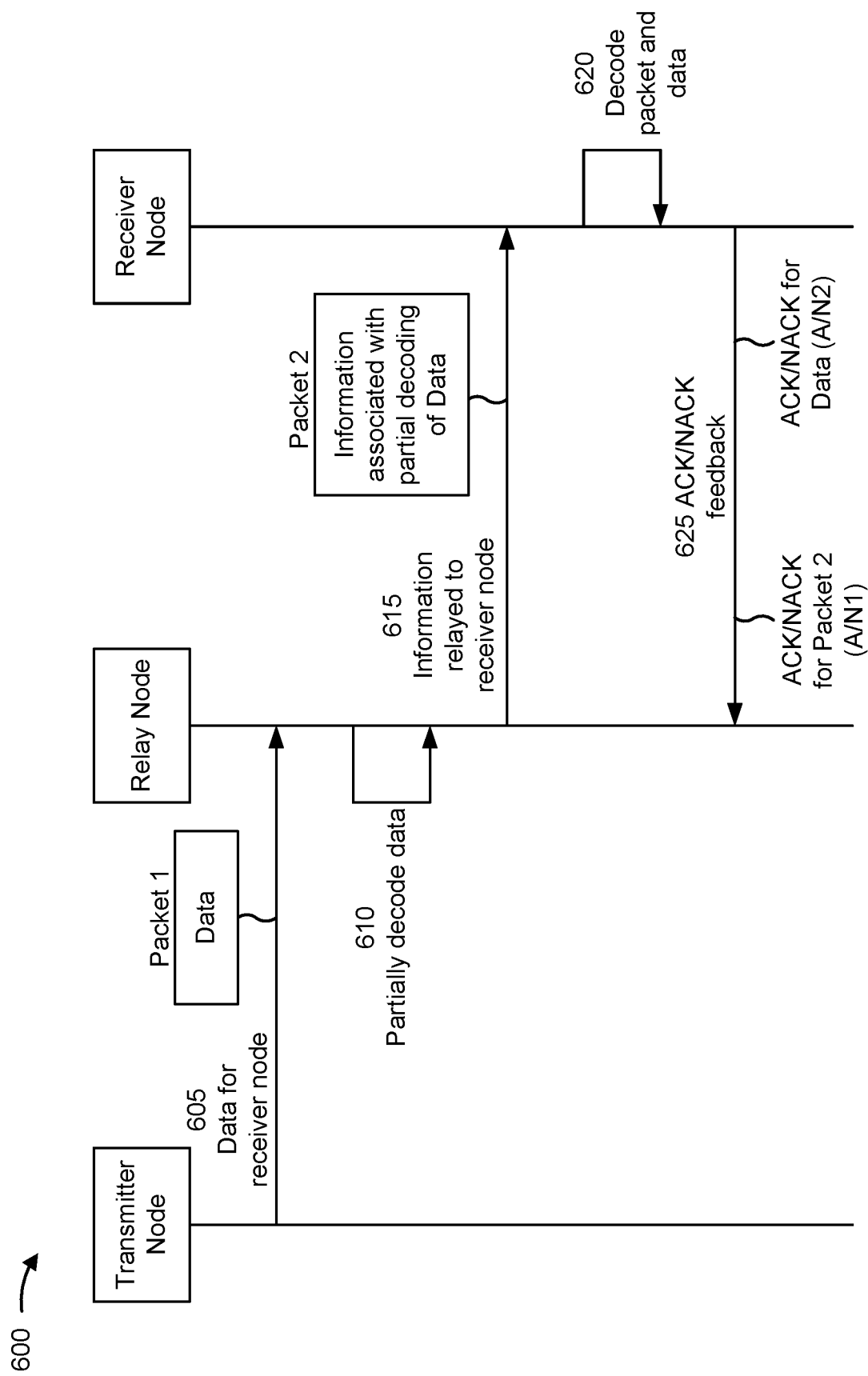
FIGS. 6-8 are diagrams illustrating one or more examples of HARQ procedures for a relay using partial decoding, in accordance with the present disclosure.

FIG. 6 is a diagram illustrating an example 600 of HARQ procedures for a relay using partial decoding, in accordance with the present disclosure.

As shown in FIG. 6, example 600 may include a plurality of wireless nodes. For example, example 600 may include a transmitter node (e.g., a base station 110, a UE 120, and/or the like), a relay node (e.g., a base station 110, a UE 120, and/or the like), and/or a receiver node (e.g., a base station 110, a UE 120, and/or the like). In some aspects, one or more of the transmitter node, the relay node, or the receiver node may be IAB nodes (e.g., for IAB relaying). In some aspects, one or more of the transmitter node, the relay node, or the receiver node may be UEs (e.g., for sidelink relaying).

As shown in FIG. 6, and by reference number 605, the transmitter node may transmit, and the relay node may receive (e.g., using antenna 234, DEMOD 232, MIMO detector 236, receive processor 238, controller/processor 240, antenna 252, DEMOD 254, MIMO detector 256, receive processor 258, controller/processor 280, reception component 1104, processor 1206, computer-readable medium/memory 1208, transceiver 1210, antenna(s) 1212, and/or the like) data for the receiver node (e.g., the transmitter node may have data for the receiver node, and the data may be transmitted to the relay node to be relayed to the receiver node). For example, the transmitter node may transmit a packet (Packet 1) to the relay node, and the packet may contain data for the receiver node.

As shown by reference number 610, the relay node may perform (e.g., using controller/processor 240, controller/processor 280, processor 1206, computer-readable medium/memory 1208, a waveform sampler component, a channel decoder component, and/or the like) partial decoding of the data. For example, the relay node may process the data using a waveform sampler component, may partially process the data using a channel decoder component (e.g., using less iterations of the channel decoder than needed to fully decode the data), and/or the like. In other words, instead of decoding the data all the way (e.g., instead of decoding bits out of the channel decoder) and then re-encoding, the relay node may stop decoding the data at a channel decoder stage. Accordingly, the relay node may obtain information associated with the partial decoding of the data (that is, the original data transmitted by the transmitter node). For example, the relay node may obtain IQ samples associated with the original data, modulation symbols associated with the original data, LLR values associated with the original data, and/or the like.

In some aspects, the relay node may encode the information associated with the partial decoding of the original data. For example, the relay node may provide the content of the channel decoder component (e.g., LLR values) to a channel encoder component of the relay node, and the channel encoder component may encode the contents of the channel decoder component (e.g., which is representative of the original data sent by the transmitter node) in a packet.

As shown by reference number 615, the relay node may relay (e.g., using controller/processor 240, transmit processor 220, TX MIMO processor 230, MOD 232, antenna 234, controller/processor 280, transmit processor 264, TX MIMO processor 266, MOD 254, antenna 252, transmission component 1106, processor 1206, computer-readable medium/memory 1208, transceiver 1210, antenna(s) 1212, and/or the like) information to the receiver node. For example, the relay node may transmit, and the receiver node may receive, a packet (Packet 2) that contains information associated with the partial decoding of the original data. That is, the relay node may transmit, in the packet, the contents of the relay node's channel decoder component (e.g., LLR values). Accordingly, the information associated with the partial decoding of the original data may be representative of a packet (e.g., Packet 1 transmitted by the transmitter node, which may be referred to as a parent packet or an underlying packet) inside a packet (e.g., Packet 2).

In some aspects, the relay node may further process the original data while relaying the information to the receiver node or after relaying the information to the receiver node. For example, the relay node may further process the original data using the channel decoder component (e.g., process the original data using additional iterations of the channel decoder relative to the initial partial decoding of the data). Accordingly, the relay node may obtain updated information associated with partial decoding of the data, such as updated LLR values, based at least in part on performing the further processing. In some aspects, the relay node may fully decode the original data (e.g., obtain decoded bits of the original data) while relaying the information to the receiver node or after relaying the information to the receiver node.

As shown by reference number 620, the receiver node may attempt to decode (e.g., using controller/processor 240, controller/processor 280, processor 1406, computer-readable medium/memory 1408, a waveform sampler component, a channel decoder component, and/or the like) the packet (e.g., Packet 2) and the original data (e.g., the data originally transmitted by the transmitter node). For example, the receiver node may decode the packet to obtain the information associated with the partial decoding of the original data, and the receiver node may use the information associated with the partial decoding of the original data to decode the original data (e.g., the receiver node can put the information sent by the relay node into the receiver node's channel decoder to decode the original data). In this way, decoding complexity at the receiver node may be reduced by using the partial decoding of the original data performed by the relay node (e.g., the relay node and the receiver node may perform cooperative decoding). However, in some cases, the receiver node may be unable to decode one or both of the packet (e.g., Packet 2) or the original data (e.g., using the information associated with the partial decoding of the original data).

As shown by reference number 625, the receiver node may transmit (e.g., using controller/processor 240, transmit processor 220, TX MIMO processor 230, MOD 232, antenna 234, controller/processor 280, transmit processor 264, TX MIMO processor 266, MOD 254, antenna 252, transmission component 1306, processor 1406, computer-readable medium/memory 1408, transceiver 1410, antenna(s) 1412, and/or the like) ACK/NACK feedback (e.g., HARQ-ACK feedback) to the relay node. In some aspects, the ACK/NACK feedback may indicate first ACK/NACK feedback (A/N1) for the packet (e.g., the first ACK/NACK feedback is for receipt of the packet containing the pre-decoded information, such as LLR values, IQ samples, and/or the like), and second ACK/NACK feedback (A/N2) for the original data (e.g., the second ACK/NACK feedback is for successful decoding of the underlying packet for which the pre-decoded information was received).

In other words, the receiver node needs to send ACK/NACK feedback (A/N1) for the packet sent by the relay node, in a same manner that the receiver node would send ACK/NACK feedback for any other packet. Moreover, the receiver node needs to send additional ACK/NACK feedback (A/N2) according to whether the receiver node was able to decode the original data (e.g., the parent packet) using the information associated with the partial decoding of the original data (e.g., whether the receiver node was able to decode the packet inside the packet).

In some aspects, the first ACK/NACK feedback and the second ACK/NACK feedback may be allocated two bits. For example, the first ACK/NACK feedback may be indicated by a first bit of the two bits, and the second ACK/NACK feedback may be indicated by a second bit of the two bits. In some aspects, the receiver node may transmit the two bits in the same resource (e.g., as part of HARQ codebook on a physical uplink control channel (PUCCH) and/or a physical uplink shared channel (PUSCH)). In some aspects, the receiver node may transmit the two bits in separate resources (e.g., two PUCCH resources or two physical sidelink feedback channel (PSFCH) resources on a sidelink).

In some aspects, a timing value (e.g., a k1 value) between receiving a packet and transmitting ACK/NACK feedback may be common to the first ACK/NACK feedback and the second ACK/NACK feedback, or separate timing values may be used for the first ACK/NACK feedback and the second ACK/NACK feedback. For example, a timing value (e.g., a k1 value) for the second ACK/NACK feedback may be greater than a timing value (e.g., a k1 value) for the first ACK/NACK feedback, to allow more time for the receiver node to decode the original data.

In some aspects, the channelization for the first ACK/NACK feedback and the second ACK/NACK feedback may be different. For example, the first ACK/NACK feedback and the second ACK/NACK feedback may use different PUCCH formats. As another example, one of the first ACK/NACK feedback or the second ACK/NACK feedback may be transmitted in a PUCCH, and the other of the first ACK/NACK feedback or the second ACK/NACK feedback may be transmitted in a PUSCH.

In some aspects, the first ACK/NACK feedback and the second ACK/NACK feedback may be bundled. For example, the receiver node may transmit only the second ACK/NACK feedback, and the first ACK/NACK feedback may correspond to the second ACK/NACK feedback (e.g., if the second ACK/NACK feedback is positive, then the first ACK/NACK feedback is also positive).

In some aspects, the receiver node may transmit a single value that indicates respective states of the first ACK/NACK feedback and the second ACK/NACK feedback (e.g., a tri-state ACK/NACK feedback, which excludes the impossible state of the first ACK/NACK feedback being negative and the second ACK/NACK feedback being positive). For example, a first value (e.g., 0) may indicate that the first ACK/NACK feedback and the second ACK/NACK feedback are positive; a second value (e.g., 1) may indicate that the first ACK/NACK feedback is positive and the second ACK/NACK feedback is negative; and a third value (e.g., 2) may indicate that the first ACK/NACK feedback and the second ACK/NACK feedback are negative.

In some aspects, the first ACK/NACK feedback may be TB-based (e.g., non-CBG-based). That is, the first ACK/NACK feedback may be for the entire packet transmitted by the relay node. In some aspects, the first ACK/NACK feedback may be CBG-based. That is, the first ACK/NACK feedback may be for one or more CBGs of the packet transmitted by the relay node (e.g., as in usual HARQ for access link communication or sidelink communication).

In some aspects, the second ACK/NACK feedback may be TB-based (e.g., non-CBG-based). That is, the second ACK/NACK feedback may be for the entire parent packet (e.g., the entire original data) transmitted by the transmitter node. In some aspects, the second ACK/NACK feedback may be CBG-based. That is, the second ACK/NACK feedback may be for one or more CBGs of the original data. In some aspects, a quantity of CBGs used by the transmitter node to transmit the original data may be different from a quantity of CBGs used by the relay node to transmit the information associated with the partial decoding of the original data (or used by the relay node to transmit the original data after full decoding of the original data by the relay node).

In some aspects, the relay node may transmit one or more CBs and/or CBGs of the original data as bits (e.g., when the relay node fully decodes the one or more CBs and/or CBGs). In some aspects, the relay node may transmit one or more CBs and/or CBGs of the original data as LLR values (e.g., according to the partial decoding of the original data). In some aspects, groupings of CBs into CBGs may be different for CBs transmitted as bits and CBs transmitted as LLR values. In some aspects, the receiver node may transmit ACK/NACK feedback for CBs and/or CBGs transmitted as bits separately from, or together with, ACK/NACK feedback for CBs and/or CBGs transmitted as LLR values.

In some aspects, the criteria used for when the receiver node is to fully decode the packet may be different for CBG-based ACK/NACK feedback than criteria used for TB-based ACK/NACK feedback. In some aspects, the relay node may indicate one or more CBGs for which the receiver node is to report ACK/NACK feedback. In some aspects, the receiver node may report ACK/NACK feedback only for one or more CBGs transmitted as LLR values. This may be useful when the relay node and the receiver node use cooperative decoding because the CBGs for which the receiver node is not to report ACK/NACK feedback may be assumed to be fully decoded at the relay node.

In some aspects, the relay node may transmit, and the receiver node may receive, information that indicates a HARQ status of the relay node with the transmitter node. For example, the information may indicate whether one or more CBGs of the original data transmitted by the transmitter node were successfully decoded by the relay node. The information may provide an indication to the receiver node of which CBs and/or CBGs the receiver node is to expect to receive as bits or LLR values and/or an indication to the receiver node of which CBs and/or CBGs are to be relayed from the relay node (e.g., for cooperative relaying).

In some aspects, the relay node may perform a retransmission if NACK feedback is reported by the receiver node. For example, if the first ACK/NACK feedback is negative, the relay node may retransmit a packet that contains the information associated with the partial decoding of the original data. As another example, if the second ACK/NACK feedback is negative, the relay node may retransmit a packet that contains updated information associated with additional decoding (e.g., relative to the partial decoding) of the original data (e.g., updated LLR values), or that contains the original data.

As indicated above, FIG. 6 is provided as an example. Other examples may differ from what is described with respect to FIG. 6.

Figure 7:
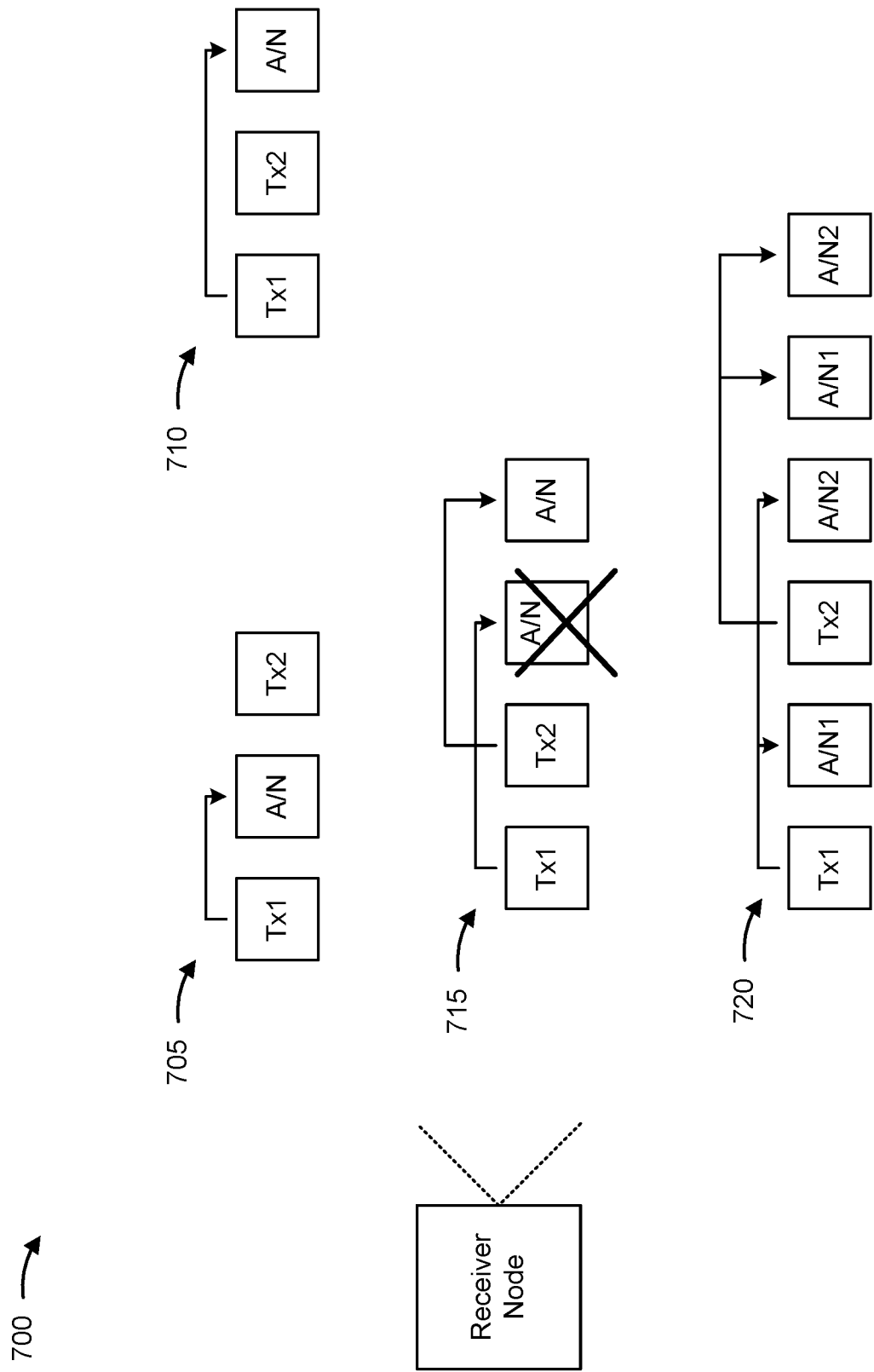

FIG. 7 is a diagram illustrating an example 700 of HARQ procedures for a relay using partial decoding, in accordance with the present disclosure.

In some aspects, the relay node and/or the receiver node may be configured or otherwise provisioned with one or more rules that are to be used in connection with HARQ processes. For example, the relay node and/or the receiver node may be configured with one or more rules indicating that transmissions or retransmissions are to be sequential per HARQ process. In other words, a new transmission or retransmission cannot begin on a HARQ process before ACK/NACK feedback for a previous packet on the HARQ process is transmitted.

This is illustrated by reference number 705, which shows that ACK/NACK feedback (A/N) for a first transmission (Tx1) associated with a particular HARQ process is reported before a second transmission (Tx2, which may be a new transmission or a retransmission of Tx1) associated with the HARQ process. Reference number 710 shows a violation of the rule that transmissions or retransmissions are to be sequential per HARQ process. In particular, reference number 710 shows that ACK/NACK feedback (A/N) for a first transmission (Tx1) associated with a particular HARQ process is reported after a second transmission (Tx2, which may be a new transmission or a retransmission of Tx1) associated with the HARQ process.

In some aspects, after the initial partial decoding of the original data, the relay node may perform additional decoding of the original data to obtain updated information associated with the original data (e.g., updated LLR values), or may fully decode the original data, as described above. In some cases, the relay node may obtain the updated information, or fully decode the original data, while the receiver node is processing the packet previously transmitted by the relay node (which may be referred to as the previous packet) and/or processing the information associated with the partial decoding of the original data. In such cases, the relay node and/or the receiver node may be configured or otherwise provisioned with HARQ procedures that accommodate, or violate, the rule that transmissions or retransmissions are to be sequential per HARQ process.

In some aspects, the relay node may transmit, and the receiver node may receive, a new packet (e.g., a new transmission) that contains updated information, such as updated LLR values, associated with partial decoding of the original data, or includes the original data (e.g., the relay node decoded the parent packet and the new packet includes the original data instead of updated LLR values). The relay node may transmit the new packet prior to receiving the first ACK/NACK feedback for the previous packet (e.g., which contains the information associated with the partial decoding of the original data, as described above) and/or the second ACK/NACK feedback for the original data. In such cases, it may be useful to abort the previous packet before ACK/NACK feedback for the previous packet is reported.

In some aspects, the previous packet (e.g., containing the initial LLR values) and the new packet (e.g., containing the updated LLR values or the original data) may be associated with different HARQ processes. In some aspects, the previous packet and the new packet may be associated with the same HARQ process when the previous packet and the new packet are both associated with the original data (e.g., the rule that transmissions or retransmissions are to be sequential per HARQ process may be violated if the new transmission is linked to the same parent packet as the previous transmission). For example, the previous packet and the new packet may both include partial decoding information, such as LLR values, for the original data. As another example, the previous packet may include partial decoding information, such as LLR values, for the original data, and the new packet may include the original data.

In some aspects, the new packet includes updated information associated with partial decoding of the original data (e.g., updated LLR values for the original data), and the new packet may be a HARQ retransmission of the previous packet (e.g., the previous packet and the new packet are associated with the same HARQ process and are linked to the same parent packet). In this case, the new packet (e.g., the retransmission) may indicate that the initial information associated with partial decoding (e.g., the initial LLR values) are to be discarded (e.g., the new packet may include a flush indicator or a pre-emption indicator indicating that the old LLR values are to be wiped out).

In some aspects, the new packet may contain updated information associated with partial decoding of the original data (e.g., updated LLR values) or the original data on a CB and/or CBG basis. In this case, the new packet may include updated LLR values or original data for at least one CB and/or CBG of the original data (e.g., the parent TB), may include updated LLR values or original data for all CBs and/or CBGs of the original data transmitted to the receiver node, may include updated LLR values or original data for all CBs and/or CBGs of the original data, and/or the like.

In some aspects, the first ACK/NACK feedback (e.g., for the previous packet containing the information associated with the partial decoding) and/or the second ACK/NACK feedback (e.g., for the original data) may be cancelled (e.g., skipped) when the relay node transmits the new packet. For example, as shown by reference number 715, ACK/NACK feedback (A/N) for a first transmission (Tx1) associated with a particular HARQ process may be cancelled when a second transmission (Tx2) associated with the HARQ process is transmitted before the ACK/NACK feedback is reported. In this example, the first transmission may include LLR values associated with the original data, and the second transmission may include updated LLR values associated with the original data or include the original data. In some aspects, the transmitter node, the relay node, a base station 110, a UE 120, and/or the like, may attempt to re-use the resources associated with the cancelled ACK/NACK feedback (e.g., for scheduling a different transmission).

In some aspects, the ACK/NACK feedback that is to be cancelled may be associated with one or more CBs and/or CBGs of the previous packet. For example, the cancelled ACK/NACK feedback may be per CB and/or per CBG (e.g., if ACK/NACK feedback for respective CBs and/or CBGs is to be on separate channels, such as separate PSFCHs). As another example, the cancelled ACK/NACK feedback may be for a plurality of CBs and/or CBGs (e.g., the cancelled ACK/NACK feedback may be associated with a block of ACK/NACK feedback according to a configured HARQ codebook, or the HARQ codebook may be de-configured to enable respective ACK/NACK feedback, as described above).

In some aspects, the previous packet may include information associated with partial decoding, such as LLR values, for the original data (e.g., transmitted in the parent packet), the new packet may include information associated with partial decoding, such as LLR values, for different data (e.g., transmitted in a different parent packet), and the relay node may transmit the new packet before the receiver node reports ACK/NACK feedback for the previous packet. For example, the relay node may transmit the new packet before the receiver node reports the second ACK/NACK feedback (e.g., for the original data) for the previous packet (e.g., the new packet may be transmitted before the second ACK/NACK feedback for the previous packet but not before the first ACK/NACK feedback for the previous packet). For example, as shown by reference number 720, a second transmission (Tx2) may be transmitted after the first ACK/NACK feedback (A/N1) is reported for a first transmission (Tx1) and before the second ACK/NACK feedback is reported for the first transmission.

In some aspects, a HARQ process may be associated (e.g., linked) with a single parent packet. In this case, the receiver node must decode (and ACK) the previous packet before the receiver node attempts to decode the new packet (e.g., as shown by reference number 720). In some aspects, a HARQ process may be associated (e.g., linked) with a plurality of parent packets. In this case, the first ACK/NACK feedback for the previous packet may be reported before the first ACK/NACK feedback for the new packet and/or the second ACK/NACK feedback for the new packet may be reported before the second ACK/NACK feedback for the previous packet. Moreover, information indicating that a packet is associated with a new parent packet may be conveyed by a linkage other than a linkage to a HARQ process, or may be conveyed more directly (e.g., explicitly). For example, the linkage may be based at least in part on a HARQ process identifier that is defined for parent packets.

As indicated above, FIG. 7 is provided as an example. Other examples may differ from what is described with respect to FIG. 7.

Figure 8:
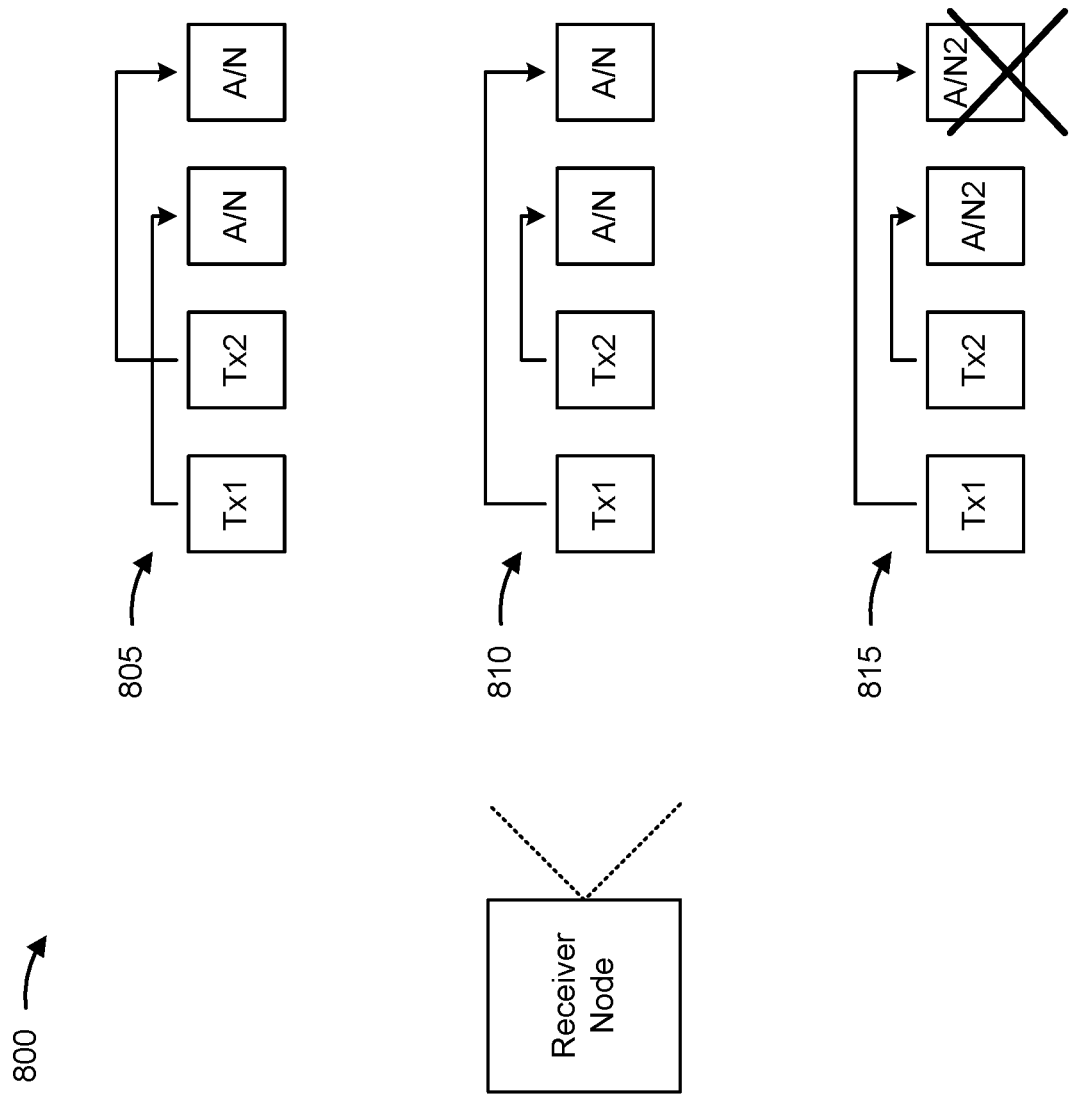

FIG. 8 is a diagram illustrating an example 800 of HARQ procedures for a relay using partial decoding, in accordance with the present disclosure.

In some aspects, the relay node and/or the receiver node may be configured or otherwise provisioned with one or more rules that are to be used in connection with an ordering of HARQ feedback. For example, the relay node and/or the receiver node may be configured with one or more rules indicating that ACK/NACK feedback is to be reported in an order in which packets are communicated. In other words, ACK/NACK feedback cannot be reported for a more recent packet earlier than ACK/NACK feedback is reported for an older packet.

This is illustrated by reference number 805, which shows that ACK/NACK feedback (A/N) for a first transmission (Tx1) in time is reported before ACK/NACK feedback (A/N) for a second transmission (Tx2, which may be a new transmission or a retransmission of Tx1) in time. Reference number 810 shows a violation of the rule that ACK/NACK feedback is to be reported in an order in which packets are communicated. In particular, reference number 810 shows that ACK/NACK feedback (A/N) for a first transmission (Tx1) in time is reported after ACK/NACK feedback (A/N) for a second transmission (Tx2, which may be a new transmission or a retransmission of Tx1) in time is reported.

In some aspects, after the initial partial decoding of the original data, the relay node may perform additional decoding of the original data to obtain updated information associated with the original data (e.g., updated LLR values), or may fully decode the original data, as described above. In some cases, the relay node may obtain the updated information, or fully decode the original data, while the receiver node is processing the packet previously transmitted by the relay node and/or processing the information associated with the partial decoding of the original data. In such cases, the relay node and/or the receiver node may be configured or otherwise provisioned with HARQ procedures that accommodate, or violate, the rule that ACK/NACK feedback is to be reported in an order in which packets are communicated.

In some aspects, the relay node may transmit, and the receiver node may receive, a new packet (e.g., a new transmission) that contains updated information associated with partial decoding of the original data (e.g., updated LLR values associated with the original data), or includes the original data. The relay node may transmit the new packet prior to receiving the first ACK/NACK feedback for the previous packet (e.g., which contains the information associated with the partial decoding of the original data, as described above) and/or the second ACK/NACK feedback for the original data. Moreover, the receiver node may transmit ACK/NACK feedback for the new packet before transmitting the first ACK/NACK feedback and/or the second ACK/NACK feedback for the previous packet. For example, the receiver node may transmit the first ACK/NACK feedback for the new packet (e.g., which contains the updated information associated with the additional decoding of the original data) and/or the second ACK/NACK feedback for the original data (e.g., based at least in part on decoding the original data using the updated information of the new packet).

In some aspects, the new packet may contain updated information associated with partial decoding of the original data (e.g., updated LLR values) or the original data on a CB and/or CBG basis, as described above. In some aspects, the second ACK/NACK feedback for the new packet (e.g., if reported before the second ACK/NACK feedback for the previous packet) may indicate the second ACK/NACK feedback for the previous packet. For example, if the second ACK/NACK feedback for the new packet is positive, this may implicitly indicate that the second ACK/NACK feedback for the previous packet is also positive.

Negative feedback for the second ACK/NACK feedback for the new packet may not implicitly indicate the second ACK/NACK feedback for the previous packet, and therefore the second ACK/NACK feedback for the new packet may implicitly indicate the second ACK/NACK feedback for the previous packet only when the second ACK/NACK feedback for the new packet is positive. Accordingly, if the second ACK/NACK feedback for the previous packet is to use separate resources for positive feedback and negative feedback, then the implicit indication (and/or the cancellation described below) may apply only to resources used for positive feedback.

In some aspects, the second ACK/NACK feedback for the new packet (e.g., if reported before the second ACK/NACK feedback for the previous packet) may indicate the second ACK/NACK feedback for the previous packet when the previous packet and the new packet both contain partial decoding information, such as LLR values, for the original data, or the previous packet contains partial decoding information, such as LLR values, for the original data and the new packet contains the original data (e.g., the previous packet and the new packet are both associated with the same parent packet). In some aspects, the rule that ACK/NACK feedback is to be reported in an order in which packets are communicated may apply to the first ACK/NACK feedbacks for the previous packet and the new packet. That is, the receiver node may report the first ACK/NACK feedback for the previous packet before reporting the first ACK/NACK feedback for the new packet (e.g., even if the second ACK/NACK feedback for the new packet is to be reported before the second ACK/NACK feedback for the previous packet).

In some aspects, the first ACK/NACK feedback and/or the second ACK/NACK feedback associated with the previous packet may be cancelled (e.g., skipped) when the receiver node reports ACK/NACK feedback (e.g., the second ACK/NACK feedback) for the new packet before reporting ACK/NACK feedback (e.g., the second ACK/NACK feedback) for the previous packet. For example, as shown by reference number 815, the second ACK/NACK feedback (A/N2) for a first transmission (Tx1) in time may be cancelled when the second ACK/NACK feedback (A/N2) for a second transmission (Tx2) in time is transmitted before the second ACK/NACK feedback for the first transmission. In this example, the first transmission may include information associated with partial decoding of the original data (e.g., LLR values associated with the original data), and the second transmission may include updated information associated with partial decoding of the original data (e.g., updated LLR values associated with the original data) or include the original data.

In some aspects, the ACK/NACK feedback that is to be cancelled may be associated with one or more CBs and/or CBGs of the previous packet, as described above. In some aspects, the transmitter node, the relay node, a base station 110, a UE 120, and/or the like, may attempt to re-use the resources associated with the cancelled ACK/NACK feedback (e.g., for scheduling a different transmission). In some aspects, the receiver node may skip or otherwise discontinue decoding the previous packet when the ACK/NACK feedback for the new packet is received (e.g., even if the older packet has not been decoded, there is no need to decode the older packet if the new packet has been decoded).

As indicated above, FIG. 8 is provided as an example. Other examples may differ from what is described with respect to FIG. 8.

Figure 9:
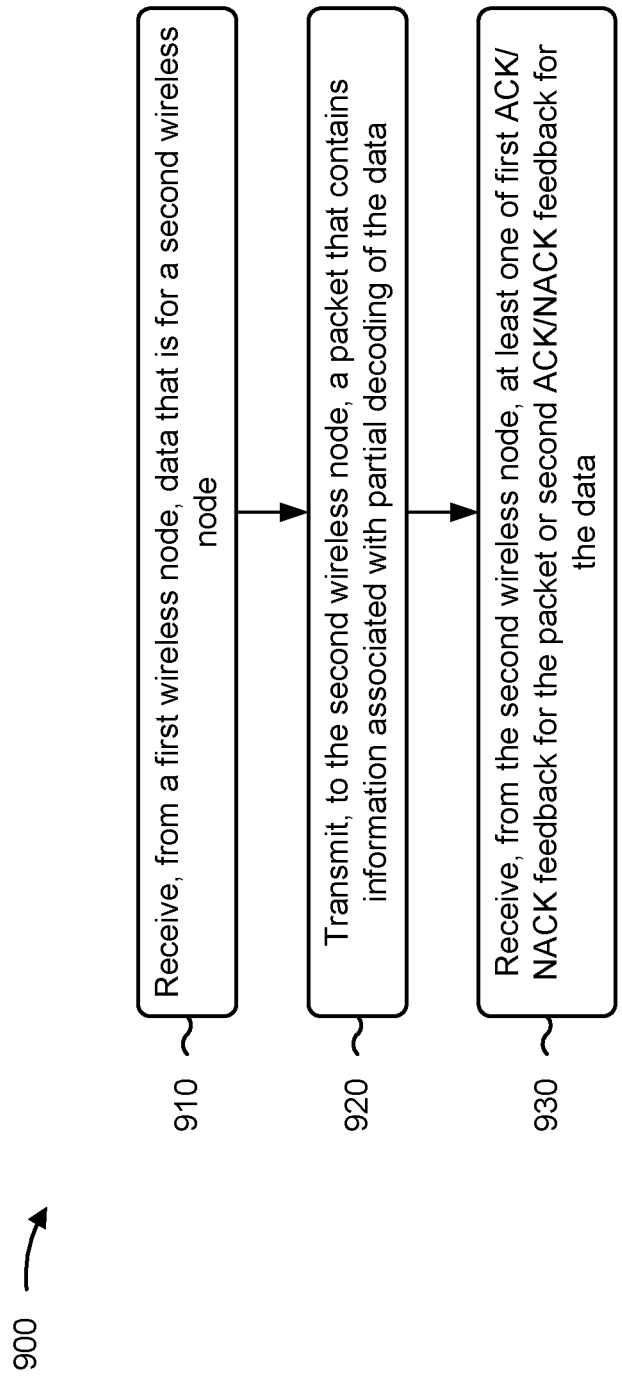
FIGS. 9 and 10 are diagrams illustrating example processes performed, for example, by a wireless node, in accordance with the present disclosure.

FIG. 9 is a diagram illustrating an example process 900 performed, for example, by a wireless node, in accordance with the present disclosure. Example process 900 is an example where the wireless node (e.g., a BS 110, a UE 120, and/or the like) performs operations associated with HARQ procedures for a relay using partial decoding.

As shown in FIG. 9, in some aspects, process 900 may include receiving, from a first wireless node, data that is for a second wireless node (block 910). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive (as shown by reference number 605), from a first wireless node, data that is for a second wireless node, as described above.

As further shown in FIG. 9, in some aspects, process 900 may include transmitting, to the second wireless node, a packet that contains information associated with partial decoding of the data (block 920). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit (as shown by reference number 615), to the second wireless node, a packet that contains information associated with partial decoding of the data (as shown by reference number 610), as described above.

As further shown in FIG. 9, in some aspects, process 900 may include receiving, from the second wireless node, at least one of first ACK/NACK feedback for the packet or second ACK/NACK feedback for the data (block 930). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive (as shown by reference number 625), from the second wireless node, at least one of first ACK/NACK feedback for the packet or second ACK/NACK feedback for the data, as described above.

Process 900 may include additional aspects, such as any single aspect or any combination of aspects described below and/or in connection with one or more other processes described elsewhere herein.

In a first aspect, the first ACK/NACK feedback is indicated by a first bit and the second ACK/NACK feedback is indicated by a second bit. In a second aspect, alone or in combination with the first aspect, only the second ACK/NACK feedback is received, and the first ACK/NACK feedback corresponds to the second ACK/NACK feedback. In a third aspect, alone or in combination with one or more of the first and second aspects, respective states of the first ACK/NACK feedback and the second ACK/NACK feedback are indicated by a value that is received from the second wireless node.

In a fourth aspect, alone or in combination with one or more of the first through third aspects, the process 900 further includes transmitting, prior to receiving the at least one of the first ACK/NACK feedback or the second ACK/NACK feedback, another packet. In a fifth aspect, alone or in combination with one or more of the first through fourth aspects, the packet and the other packet are associated with different HARQ processes. In a sixth aspect, alone or in combination with one or more of the first through fifth aspects, the packet contains the information associated with partial decoding of the data, the other packet contains updated information associated with partial decoding of the data, and the packet and the other packet are associated with a same HARQ process. In a seventh aspect, alone or in combination with one or more of the first through sixth aspects, the other packet is a HARQ retransmission of the packet, and indicates that the information associated with partial decoding of the data is to be discarded.

In an eighth aspect, alone or in combination with one or more of the first through seventh aspects, the data is fully decoded by the wireless node after the packet is transmitted, the packet contains the information associated with partial decoding of the data, the other packet contains the data, and the packet and the other packet are associated with a same HARQ process. In a ninth aspect, alone or in combination with one or more of the first through eighth aspects, the at least one of the first ACK/NACK feedback or the second ACK/NACK feedback is to be cancelled when the other packet is transmitted. In a tenth aspect, alone or in combination with one or more of the first through ninth aspects, the packet contains the information associated with partial decoding of the data, and the other packet contains information associated with partial decoding of other data received from the first wireless node.

In an eleventh aspect, alone or in combination with one or more of the first through tenth aspects, process 900 includes transmitting, prior to receiving the at least one of the first ACK/NACK feedback or the second ACK/NACK feedback, another packet that contains updated information associated with partial decoding of the data; and receiving, prior to receiving the at least one of the first ACK/NACK feedback or the second ACK/NACK feedback, other ACK/NACK feedback for at least one of the other packet or the data. In a twelfth aspect, alone or in combination with one or more of the first through eleventh aspects, the packet contains LLR values associated with the data, and the other packet contains updated LLR values associated with the data. In a thirteenth aspect, alone or in combination with one or more of the first through twelfth aspects, the other ACK/NACK feedback indicates ACK feedback for the data.

In a fourteenth aspect, alone or in combination with one or more of the first through thirteenth aspects, the first ACK/NACK feedback is received prior to the other ACK/NACK feedback, and the other ACK/NACK feedback is received prior to the second ACK/NACK feedback. In a fifteenth aspect, alone or in combination with one or more of the first through fourteenth aspects, the at least one of the first ACK/NACK feedback or the second ACK/NACK feedback is to be cancelled when the other ACK/NACK feedback is received prior to the at least one of the first ACK/NACK feedback or the second ACK/NACK feedback.

In a sixteenth aspect, alone or in combination with one or more of the first through fifteenth aspects, the first ACK/NACK feedback is associated with a CBG of the packet. In a seventeenth aspect, alone or in combination with one or more of the first through sixteenth aspects, the second ACK/NACK feedback is associated with a CBG of the data. In an eighteenth aspect, alone or in combination with one or more of the first through seventeenth aspects, the second ACK/NACK feedback is associated with at least one of one or more CBGs of the data transmitted as bits or one or more CBGs of the data transmitted as LLR values.

In a nineteenth aspect, alone or in combination with one or more of the first through eighteenth aspects, the second ACK/NACK feedback is associated with a CBG of the data that is indicated for reporting ACK/NACK feedback. In a twentieth aspect, alone or in combination with one or more of the first through nineteenth aspects, the second ACK/NACK feedback is associated with a CBG of the data that is transmitted as LLR values.

In a twenty-first aspect, alone or in combination with one or more of the first through twentieth aspects, process 900 includes transmitting, to the second wireless node, information indicating a HARQ status between the wireless node and the first wireless node. In a twenty-second aspect, alone or in combination with one or more of the first through twenty-first aspects, the information associated with partial decoding of the data includes log likelihood ratio values.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
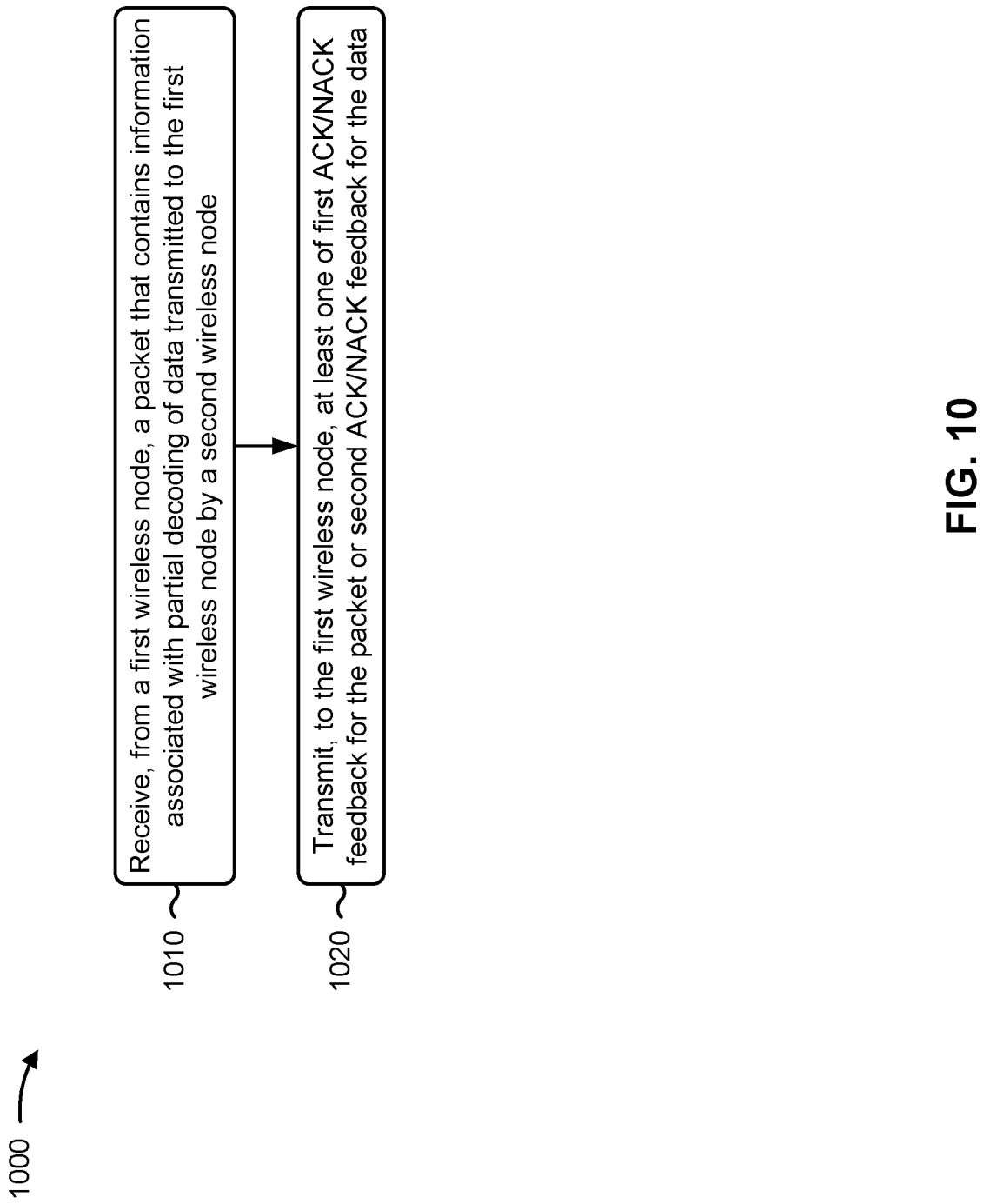

FIG. 10 is a diagram illustrating an example process 1000 performed, for example, by a wireless node, in accordance with the present disclosure. Example process 1000 is an example where the wireless node (e.g., a BS 110, a UE 120, and/or the like) performs operations associated with HARQ procedures for a relay using partial decoding.

As shown in FIG. 10, in some aspects, process 1000 may include receiving, from a first wireless node, a packet that contains information associated with partial decoding of data transmitted to the first wireless node by a second wireless node (block 1010). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive (as shown by reference number 615), from a first wireless node, a packet that contains information associated with partial decoding of data (as shown by reference number 610) transmitted to the first wireless node by a second wireless node (as shown by reference number 605), as described above.

As further shown in FIG. 10, in some aspects, process 1000 may include transmitting, to the first wireless node, at least one of first ACK/NACK feedback for the packet or second ACK/NACK feedback for the data (block 1020). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit (as shown by reference number 625), to the first wireless node, at least one of first ACK/NACK feedback for the packet or second ACK/NACK feedback for the data, as described above.

Process 1000 may include additional aspects, such as any single aspect or any combination of aspects described below and/or in connection with one or more other processes described elsewhere herein.

In a first aspect, the first ACK/NACK feedback is indicated by a first bit and the second ACK/NACK feedback is indicated by a second bit. In a second aspect, alone or in combination with the first aspect, only the second ACK/NACK feedback is transmitted, and the first ACK/NACK feedback corresponds to the second ACK/NACK feedback. In a third aspect, alone or in combination with one or more of the first and second aspects, respective states of the first ACK/NACK feedback and the second ACK/NACK feedback are indicated by a value that is transmitted to the first wireless node.

In a fourth aspect, alone or in combination with one or more of the first through third aspects, process 1000 further includes receiving, prior to transmitting the at least one of the first ACK/NACK feedback or the second ACK/NACK feedback, another packet. In a fifth aspect, alone or in combination with one or more of the first through fourth aspects, the packet and the other packet are associated with different HARQ processes. In a sixth aspect, alone or in combination with one or more of the first through fifth aspects, the packet contains the information associated with partial decoding of the data, the other packet contains updated information associated with partial decoding of the data, and the packet and the other packet are associated with a same HARQ process. In a seventh aspect, alone or in combination with one or more of the first through sixth aspects, the other packet is a HARQ retransmission of the packet, and indicates that the information associated with partial decoding of the data is to be discarded.

In an eighth aspect, alone or in combination with one or more of the first through seventh aspects, the data is fully decoded by the first wireless node after the packet is received, the packet contains the information associated with partial decoding of the data and the other packet contains the data, and the packet and the other packet are associated with a same HARQ process. In a ninth aspect, alone or in combination with one or more of the first through eighth aspects, the at least one of the first ACK/NACK feedback or the second ACK/NACK feedback is to be cancelled when the other packet is received. In a tenth aspect, alone or in combination with one or more of the first through ninth aspects, the packet contains the information associated with partial decoding of the data, and the other packet contains information associated with partial decoding of other data transmitted to the first wireless node by the second wireless node.

In an eleventh aspect, alone or in combination with one or more of the first through tenth aspects, process 1000 includes receiving, prior to transmitting the at least one of the first ACK/NACK feedback or the second ACK/NACK feedback, another packet that contains updated information associated with partial decoding of the data; and transmitting, prior to transmitting the at least one of the first ACK/NACK feedback or the second ACK/NACK feedback, other ACK/NACK feedback for at least one of the other packet or the data. In a twelfth aspect, alone or in combination with one or more of the first through eleventh aspects, the packet contains LLR values associated with the data and the other packet contains updated LLR values associated with the data. In a thirteenth aspect, alone or in combination with one or more of the first through twelfth aspects, the other ACK/NACK feedback indicates ACK feedback for the data.

In a fourteenth aspect, alone or in combination with one or more of the first through thirteenth aspects, the first ACK/NACK feedback is transmitted prior to the other ACK/NACK feedback, and the other ACK/NACK feedback is transmitted prior to the second ACK/NACK feedback. In a fifteenth aspect, alone or in combination with one or more of the first through fourteenth aspects, the at least one of the first ACK/NACK feedback or the second ACK/NACK feedback is to be cancelled when the other ACK/NACK feedback is transmitted prior to the at least one of the first ACK/NACK feedback or the second ACK/NACK feedback.

In a sixteenth aspect, alone or in combination with one or more of the first through fifteenth aspects, the first ACK/NACK feedback is associated with a CBG of the packet. In a seventeenth aspect, alone or in combination with one or more of the first through sixteenth aspects, the second ACK/NACK feedback is associated with a CBG of the data. In an eighteenth aspect, alone or in combination with one or more of the first through seventeenth aspects, the second ACK/NACK feedback is associated with at least one of one or more CBGs of the data received as bits or one or more CBGs of the data received as LLR values.

In a nineteenth aspect, alone or in combination with one or more of the first through eighteenth aspects, the second ACK/NACK feedback is associated with a CBG of the data that is indicated for reporting ACK/NACK feedback. In a twentieth aspect, alone or in combination with one or more of the first through nineteenth aspects, the second ACK/NACK feedback is associated with a CBG of the data that is received as LLR values.

In a twenty-first aspect, alone or in combination with one or more of the first through twentieth aspects, process 1000 includes receiving, from the first wireless node, information indicating a HARQ status between the first wireless node and the second wireless node. In a twenty-second aspect, alone or in combination with one or more of the first through twenty-first aspects, the information associated with partial decoding of the data includes log likelihood ratio values.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
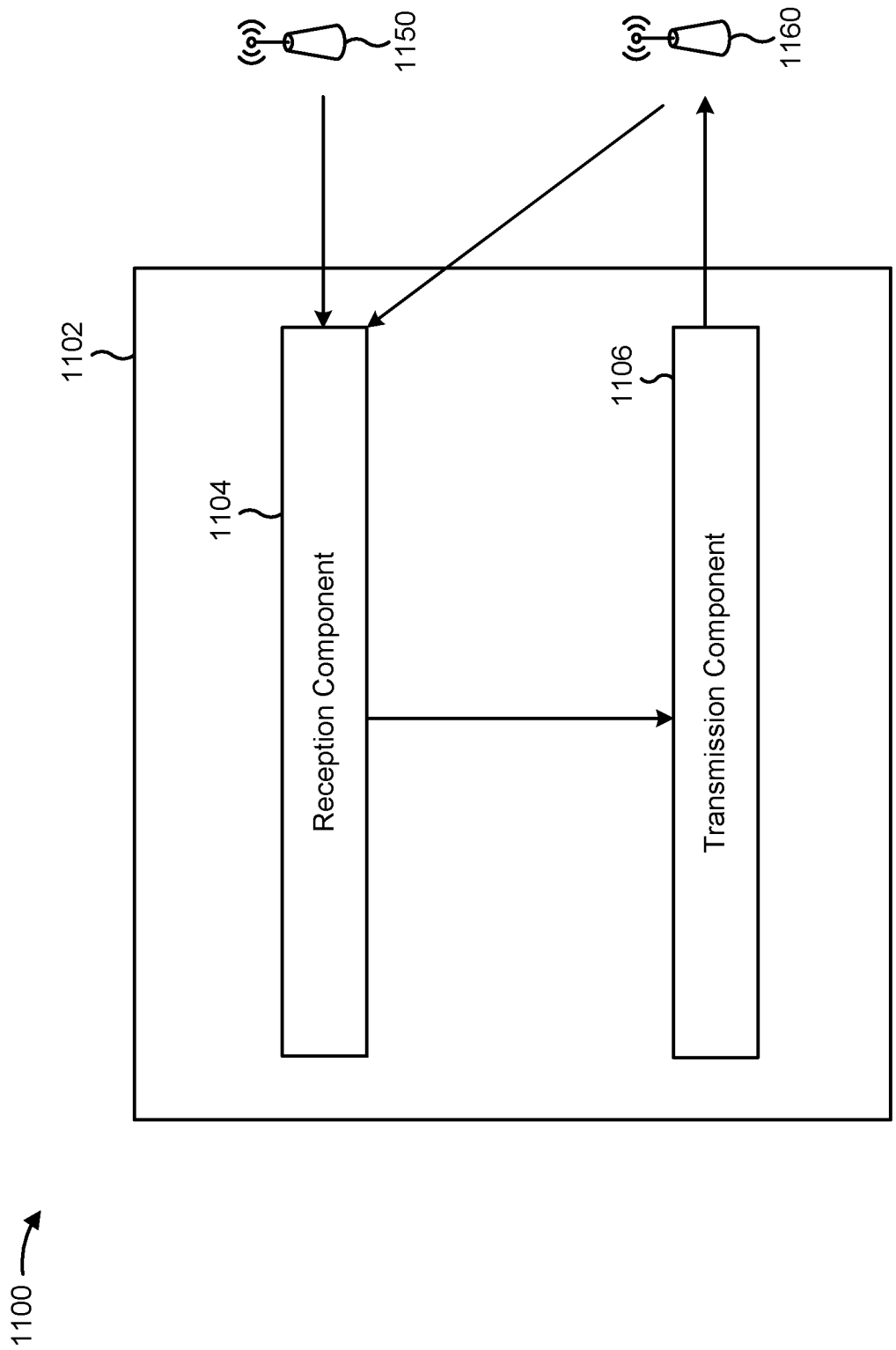
FIG. 11 is a diagram illustrating an example of a data flow between different components in an example apparatus, in accordance with the present disclosure.

FIG. 11 is a diagram 1100 illustrating a data flow between different components in an example apparatus 1102, in accordance with the present disclosure. The apparatus 1102 may be a base station (e.g., BS 110), an IAB node, a UE (e.g., UE 120), and/or the like. In some aspects, the apparatus 1102 may correspond to a relay node, as described above. In some aspects, the apparatus 1102 includes a reception component 1104 and/or a transmission component 1106.

In some aspects, reception component 1104 may receive data (e.g., as an encoded signal), from a first apparatus 1150 (e.g., a BS 110 and/or a UE 120), that is for a second apparatus 1160 (e.g., a BS 110 and/or a UE 120). Reception component 1104 may perform partial decoding of the data. For example, reception component 1104 may process the data to obtain information associated with partial decoding of the data (e.g., LLR values). Reception component 1104 may provide the information to transmission component 1106. In some aspects, transmission component 1106 may encode the information. Moreover, transmission component 1106 may transmit the information (e.g., as an encoded signal) to the second apparatus 1160. In some aspects, reception component 1104 may receive, from the second apparatus 1160, first ACK/NACK feedback associated with the transmission of the information and second ACK/NACK feedback associated with the data.

The apparatus 1102 may include additional components that perform each of the blocks of the algorithm in the aforementioned process 900 of FIG. 9, and/or the like. Each block in the aforementioned process 900 of FIG. 9, and/or the like may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

Figure 12:
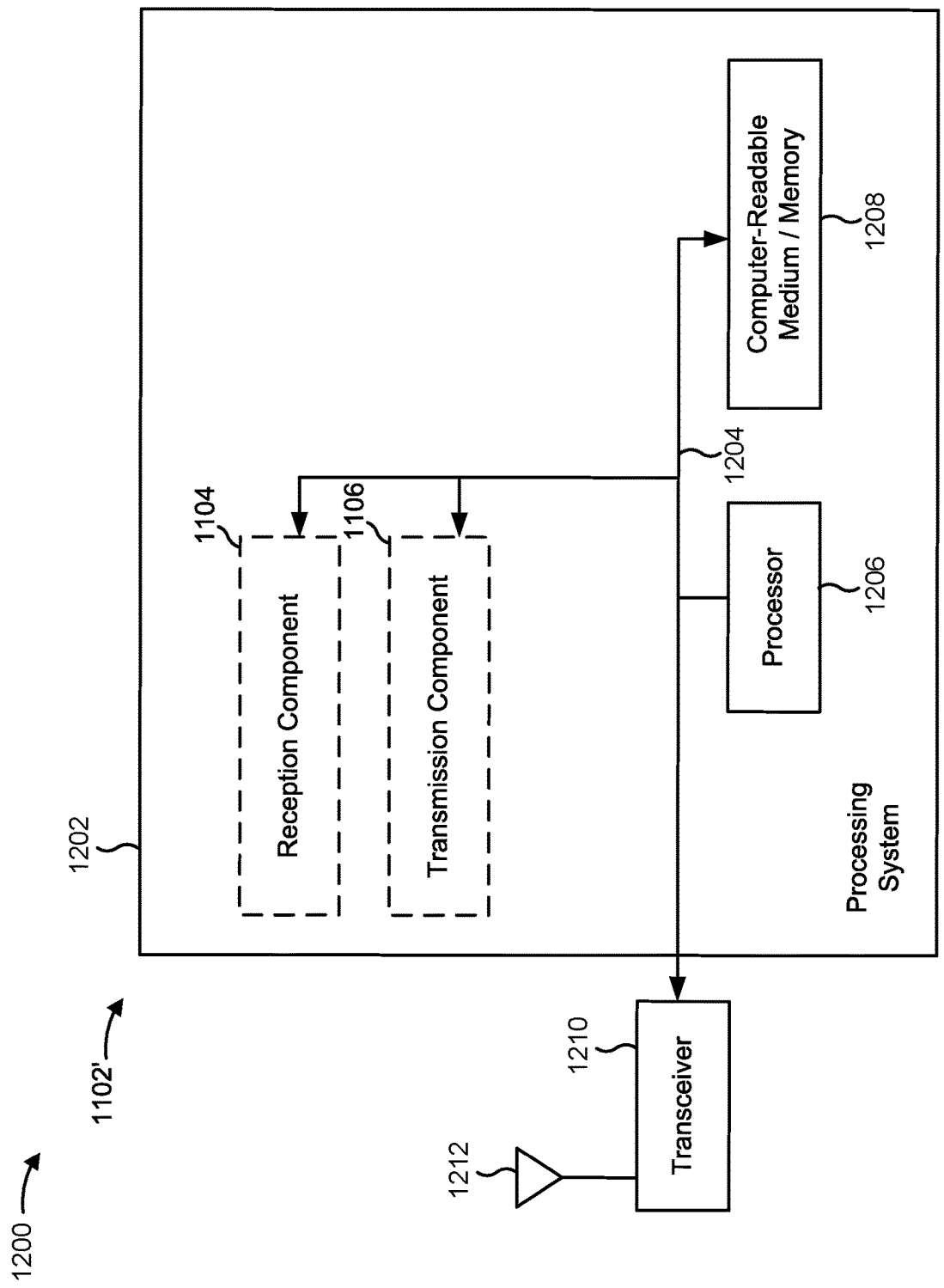
FIG. 12 is a diagram illustrating an example of a hardware implementation for an apparatus employing a processing system, in accordance with the present disclosure.

FIG. 12 is a diagram 1200 illustrating an example of a hardware implementation for an apparatus 1102' employing a processing system 1202, in accordance with the present disclosure. The apparatus 1102' may be a base station (e.g., BS 110), an IAB node, a UE (e.g., UE 120), and/or the like. In some aspects, the apparatus 1102' may correspond to a relay node, as described above.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware components, represented by the processor 1206, the components 1104 and/or 1106, and the computer-readable medium/memory 1208. The bus 1204 may also link various other circuits such as timing sources, peripherals, voltage regulators, and power management circuits, which are well known in the art, and therefore will not be described any further.

The processing system 1202 may be coupled to a transceiver 1210. The transceiver 1210 is coupled to one or more antennas 1212. The transceiver 1210 provides a means for communicating with various other apparatuses over a transmission medium. The transceiver 1210 receives a signal from the one or more antennas 1212, extracts information from the received signal, and provides the extracted information to the processing system 1202, specifically the reception component 1104. In addition, the transceiver 1210 receives information from the processing system 1202, specifically the transmission component 1106, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described herein for any particular apparatus. The computer-readable medium/memory 1208 may also be used for storing data that is manipulated by the processor 1206 when executing software. The processing system further includes at least one of the components 1104 and/or 1106. The components may be software modules running in the processor 1206, resident/stored in the computer readable medium/memory 1208, one or more hardware modules coupled to the processor 1206, or some combination thereof. The processing system 1202 may be a component of the UE 120 and may include the memory 282 and/or at least one of the transmit processor 264, the receive processor 258, and/or the controller/processor 280. The processing system 1202 may be a component of the base station 110 and may include the memory 242 and/or at least one of the transmit processor 220, the receive processor 238, and/or the controller/processor 240.

In some aspects, the apparatus 1102/1102' for wireless communication includes means for means for receiving, from a first wireless node, data that is for a second wireless node, means for transmitting, to the second wireless node, a packet that contains information associated with partial decoding of the data, means for receiving, from the second wireless node, at least one of first ACK/NACK feedback for the packet, or second ACK/NACK feedback for the data, and/or the like. The aforementioned means may be one or more of the aforementioned components of the apparatus 1102 and/or the processing system 1202 of the apparatus 1102' configured to perform the functions recited by the aforementioned means. As described elsewhere herein, the processing system 1202 may include the transmit processor 264, the receive processor 258, the controller/processor 280, the transmit processor 220, the receive processor 238, and/or the controller/processor 240. In one configuration, the aforementioned means may be the transmit processor 264, the receive processor 258, the controller/processor 280, the transmit processor 220, the receive processor 238, and/or the controller/processor 240 configured to perform the functions and/or operations recited herein.

FIG. 12 is provided as an example. Other examples may differ from what is described in connection with FIG. 12.

Figure 13:
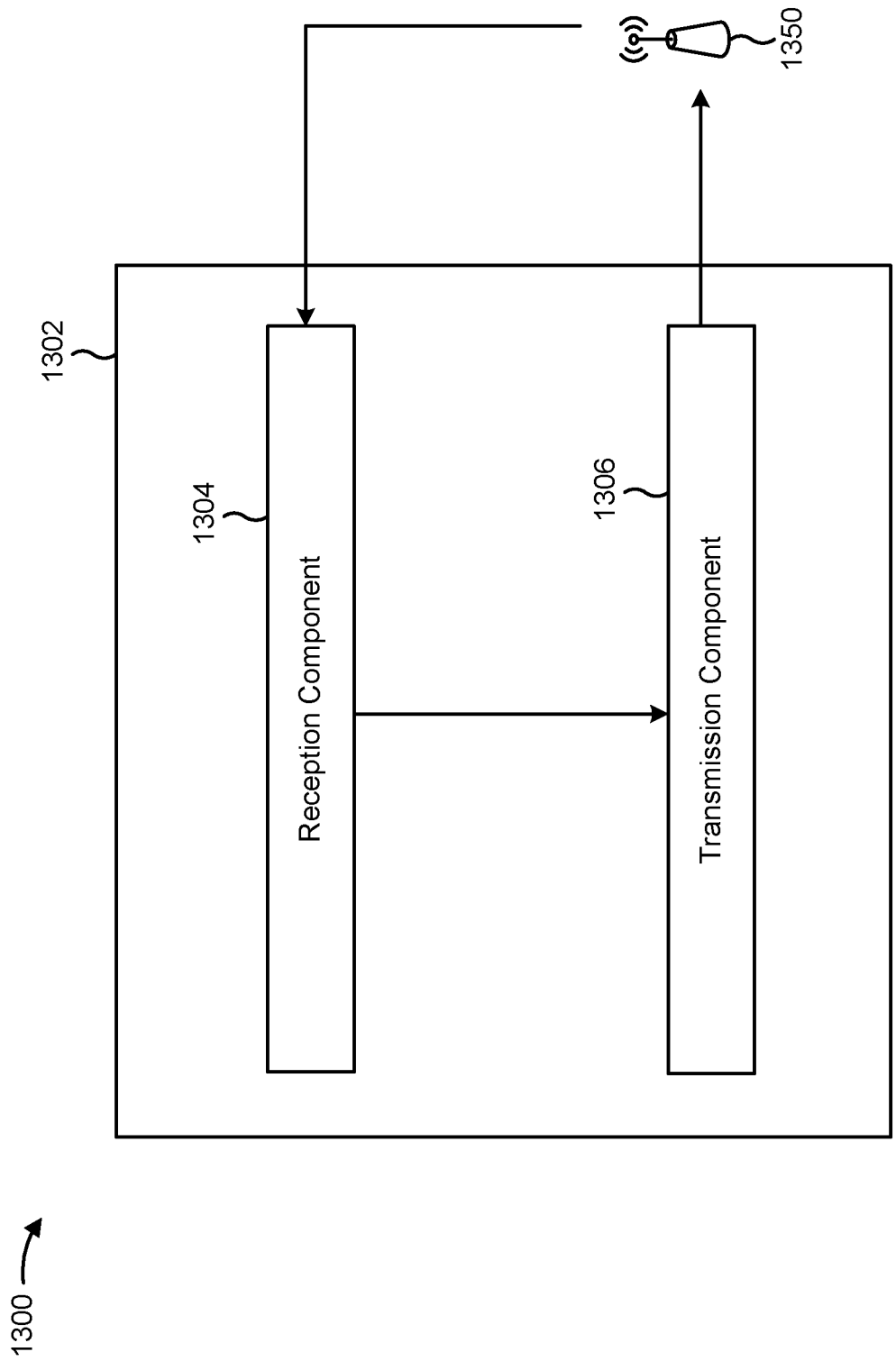
FIG. 13 is a diagram illustrating an example of a data flow between different components in an example apparatus, in accordance with the present disclosure.

FIG. 13 is a diagram 1300 illustrating a data flow between different components in an example apparatus 1302, in accordance with the present disclosure. The apparatus 1302 may be a base station (e.g., BS 110), an IAB node, a UE (e.g., UE 120), and/or the like. In some aspects, the apparatus 1302 may correspond to a receiver node, as described above. In some aspects, the apparatus 1302 includes a reception component 1304 and/or a transmission component 1308.

In some aspects, reception component 1304 may receive information associated with a partial decoding of data. For example, reception component 1304 may receive a transmission that includes the information from an apparatus 1350 (e.g., a BS 110 and/or a UE 120). Reception component 1304 may perform decoding of the transmission, and if successful, reception component 1304 may perform decoding of the data (e.g., using the information associated with the partial decoding). Reception component 1304 may provide an indication to transmission component 1306 of whether decoding of the transmission is successful and/or whether decoding of the data is successful. Transmission component 1306 may transmit first ACK/NACK feedback for the transmission and/or second ACK/NACK feedback for the data (e.g., according to the indication(s) provided by reception component 1304). For example, transmission component 1306 may transmit the first and/or second ACK/NACK feedback to the apparatus 1350.

The apparatus 1302 may include additional components that perform each of the blocks of the algorithm in the aforementioned process 1000 of FIG. 10, and/or the like. Each block in the aforementioned process 1000 of FIG. 10, and/or the like may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of components (e.g., one or more components) shown in FIG. 13 may perform one or more functions described as being performed by another set of components shown in FIG. 13.

Figure 14:
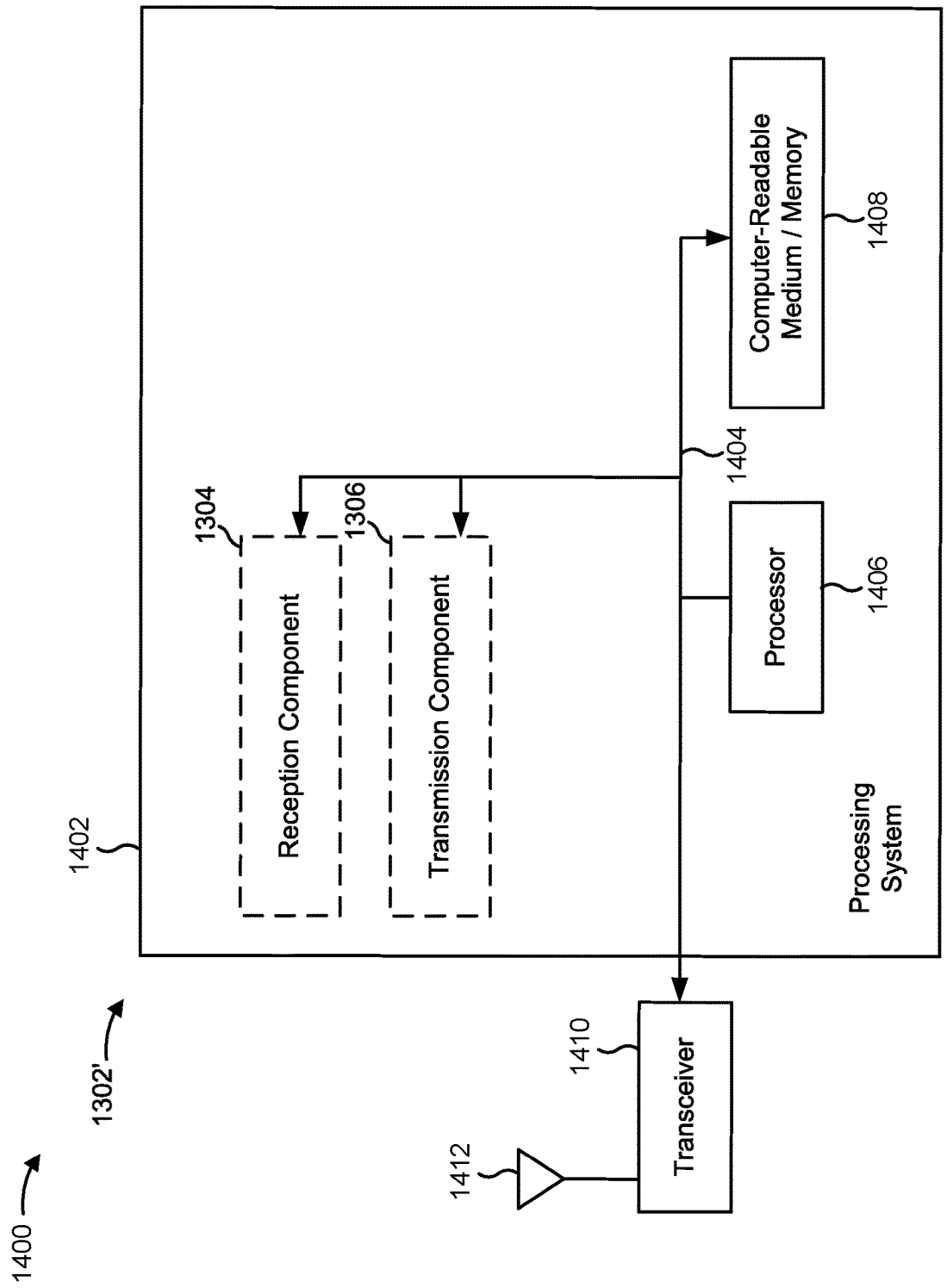
FIG. 14 is a diagram illustrating an example of a hardware implementation for an apparatus employing a processing system, in accordance with the present disclosure.

FIG. 14 is a diagram 1400 illustrating an example of a hardware implementation for an apparatus 1302' employing a processing system 1402, in accordance with the present disclosure. The apparatus 1302' may be a base station (e.g., BS 110), an IAB node, a UE (e.g., UE 120), and/or the like. In some aspects, the apparatus 1302' may correspond to a receiver node, as described above.

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware components, represented by the processor 1406, the components 1304 and/or 1306, and the computer-readable medium/memory 1408. The bus 1404 may also link various other circuits such as timing sources, peripherals, voltage regulators, and power management circuits, which are well known in the art, and therefore will not be described any further.

The processing system 1402 may be coupled to a transceiver 1410. The transceiver 1410 is coupled to one or more antennas 1412. The transceiver 1410 provides a means for communicating with various other apparatuses over a transmission medium. The transceiver 1410 receives a signal from the one or more antennas 1412, extracts information from the received signal, and provides the extracted information to the processing system 1402, specifically the reception component 1304. In addition, the transceiver 1410 receives information from the processing system 1402, specifically the transmission component 1306, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described herein for any particular apparatus. The computer-readable medium/memory 1408 may also be used for storing data that is manipulated by the processor 1406 when executing software. The processing system further includes at least one of the components 1304 and/or 1306. The components may be software modules running in the processor 1406, resident/stored in the computer readable medium/memory 1408, one or more hardware modules coupled to the processor 1406, or some combination thereof. The processing system 1402 may be a component of the UE 120 and may include the memory 282 and/or at least one of the transmit processor 264, the receive processor 258, and/or the controller/processor 280. The processing system 1402 may be a component of the base station 110 and may include the memory 242 and/or at least one of the transmit processor 220, the receive processor 238, and/or the controller/processor 240.

In some aspects, the apparatus 1302/1302' for wireless communication includes means for receiving, from a first wireless node, a packet that contains information associated with partial decoding of data transmitted to the first wireless node by a second wireless node, means for transmitting, to the first wireless node, at least one of first ACK/NACK feedback for the packet or second ACK/NACK feedback for the data, and/or the like. The aforementioned means may be one or more of the aforementioned components of the apparatus 1302 and/or the processing system 1402 of the apparatus 1302' configured to perform the functions recited by the aforementioned means. As described elsewhere herein, the processing system 1402 may include the transmit processor 264, the receive processor 258, the controller/processor 280, the transmit processor 220, the receive processor 238, and/or the controller/processor 240. In one configuration, the aforementioned means may be the transmit processor 264, the receive processor 258, the controller/processor 280, the transmit processor 220, the receive processor 238, and/or the controller/processor 240 configured to perform the functions and/or operations recited herein.

FIG. 14 is provided as an example. Other examples may differ from what is described in connection with FIG. 14.

The following provides an overview of some Aspects of the present disclosure:

Aspect 1: A method of wireless communication performed by a wireless node, comprising: receiving, from a first wireless node, data that is for a second wireless node; transmitting, to the second wireless node, a packet that contains information associated with partial decoding of the data; and receiving, from the second wireless node, at least one of first acknowledgment or negative acknowledgement (ACK/NACK) feedback for the packet or second ACK/NACK feedback for the data.

Aspect 2: The method of Aspect 1, wherein the information associated with partial decoding of the data comprises log likelihood ratio values.

Aspect 3: The method of any of Aspects 1-2, wherein the first ACK/NACK feedback is indicated by a first bit and the second ACK/NACK feedback is indicated by a second bit.

Aspect 4: The method of any of Aspects 1-2, wherein only the second ACK/NACK feedback is received, and the first ACK/NACK feedback corresponds to the second ACK/NACK feedback.

Aspect 5: The method of any of Aspects 1-2, wherein respective states of the first ACK/NACK feedback and the second ACK/NACK feedback are indicated by a value that is received from the second wireless node.

Aspect 6: The method of any of Aspects 1-5, further comprising: transmitting, prior to receiving the at least one of the first ACK/NACK feedback or the second ACK/NACK feedback, another packet.

Aspect 7: The method of Aspect 6, wherein the packet and the other packet are associated with different hybrid automatic repeat request processes.

Aspect 8: The method of Aspect 6, wherein the packet contains the information associated with partial decoding of the data, and the other packet contains updated information associated with partial decoding of the data, and wherein the packet and the other packet are associated with a same hybrid automatic repeat request (HARQ) process.

Aspect 9: The method of Aspect 8, wherein the other packet is a HARQ retransmission of the packet, and indicates that the information associated with partial decoding of the data is to be discarded.

Aspect 10: The method of Aspect 6, wherein the data is fully decoded by the wireless node after the packet is transmitted, wherein the packet contains the information associated with partial decoding of the data, and the other packet contains the data, and wherein the packet and the other packet are associated with a same hybrid automatic repeat request process.

Aspect 11: The method of any of Aspects 6-10, wherein the at least one of the first ACK/NACK feedback or the second ACK/NACK feedback is to be cancelled when the other packet is transmitted.

Aspect 12: The method of any of Aspects 6-7 and 11, wherein the packet contains the information associated with partial decoding of the data, and the other packet contains information associated with partial decoding of other data received from the first wireless node.

Aspect 13: The method of any of Aspects 1-5, further comprising: transmitting, prior to receiving the at least one of the first ACK/NACK feedback or the second ACK/NACK feedback, another packet that contains updated information associated with partial decoding of the data; and receiving, prior to receiving the at least one of the first ACK/NACK feedback or the second ACK/NACK feedback, other ACK/NACK feedback for at least one of the other packet or the data.

Aspect 14: The method of Aspect 13, wherein the packet contains log likelihood ratio (LLR) values associated with the data, and the other packet contains updated LLR values associated with the data.

Aspect 15: The method of any of Aspects 13-14, wherein the other ACK/NACK feedback indicates ACK feedback for the data.

Aspect 16: The method of any of Aspects 13-15, wherein the first ACK/NACK feedback is received prior to the other ACK/NACK feedback, and the other ACK/NACK feedback is received prior to the second ACK/NACK feedback.

Aspect 17: The method of any of Aspects 13-16, wherein the at least one of the first ACK/NACK feedback or the second ACK/NACK feedback is to be cancelled when the other ACK/NACK feedback is received prior to the at least one of the first ACK/NACK feedback or the second ACK/NACK feedback.

Aspect 18: The method of any of Aspects 1-17, wherein the first ACK/NACK feedback is associated with a code block group of the packet.

Aspect 19: The method of any of Aspects 1-18, wherein the second ACK/NACK feedback is associated with a code block group of the data.

Aspect 20: The method of any of Aspects 1-19, wherein the second ACK/NACK feedback is associated with at least one of one or more code block groups (CBGs) of the data transmitted as bits or one or more CBGs of the data transmitted as log likelihood ratio (LLR) values.

Aspect 21: The method of any of Aspects 1-20, wherein the second ACK/NACK feedback is associated with a code block group of the data that is indicated for reporting ACK/NACK feedback.

Aspect 22: The method of any of Aspects 1-21, wherein the second ACK/NACK feedback is associated with a code block group of the data that is transmitted as log likelihood ratio values.

Aspect 23: The method of any of Aspects 1-22, further comprising: transmitting, to the second wireless node, information indicating a hybrid automatic repeat request status between the wireless node and the first wireless node.

Aspect 24: A method of wireless communication performed by a wireless node, comprising: receiving, from a first wireless node, a packet that contains information associated with partial decoding of data transmitted to the first wireless node by a second wireless node; and transmitting, to the first wireless node, at least one of first acknowledgment or negative acknowledgement (ACK/NACK) feedback for the packet or second ACK/NACK feedback for the data.

Aspect 25: The method of Aspect 24, wherein the information associated with partial decoding of the data comprises log likelihood ratio values.

Aspect 26: The method of any of Aspects 24-25, wherein the first ACK/NACK feedback is indicated by a first bit and the second ACK/NACK feedback is indicated by a second bit.

Aspect 27: The method of any of Aspects 24-25, wherein only the second ACK/NACK feedback is transmitted, and the first ACK/NACK feedback corresponds to the second ACK/NACK feedback.

Aspect 28: The method of any of Aspects 24-25, wherein respective states of the first ACK/NACK feedback and the second ACK/NACK feedback are indicated by a value that is transmitted to the first wireless node.

Aspect 29: The method of any of Aspects 24-28, wherein the method further comprises: receiving, prior to transmitting the at least one of the first ACK/NACK feedback or the second ACK/NACK feedback, another packet.

Aspect 30: The method of Aspect 29, wherein the packet and the other packet are associated with different hybrid automatic repeat request (HARQ) processes.

Aspect 31: The method of Aspect 29, wherein the packet contains the information associated with partial decoding of the data and the other packet contains updated information associated with partial decoding of the data, and wherein the packet and the other packet are associated with a same hybrid automatic repeat request (HARQ) process.

Aspect 32: The method of Aspect 31, wherein the other packet is a HARQ retransmission of the packet, and indicates that the information associated with partial decoding of the data is to be discarded.

Aspect 33: The method of Aspect 29, wherein the data is fully decoded by the first wireless node after the packet is received, wherein the packet contains the information associated with partial decoding of the data and the other packet contains the data, and wherein the packet and the other packet are associated with a same hybrid automatic repeat request process.

Aspect 34: The method of any of Aspects 29-33, wherein the at least one of the first ACK/NACK feedback or the second ACK/NACK feedback is to be cancelled when the other packet is received.

Aspect 35: The method of any of Aspects 29-30 and 34, wherein the packet contains the information associated with partial decoding of the data and the other packet contains information associated with partial decoding of other data transmitted to the first wireless node by the second wireless node.

Aspect 36: The method of any of Aspects 24-28, further comprising: receiving, prior to transmitting the at least one of the first ACK/NACK feedback or the second ACK/NACK feedback, another packet that contains updated information associated with partial decoding of the data; and transmitting, prior to transmitting the at least one of the first ACK/NACK feedback or the second ACK/NACK feedback, other ACK/NACK feedback for at least one of the other packet or the data.

Aspect 37: The method of Aspect 36, wherein the packet contains log likelihood ratio (LLR) values associated with the data and the other packet contains updated LLR values associated with the data.

Aspect 38: The method of any of Aspects 36-37, wherein the other ACK/NACK feedback indicates ACK feedback for the data.

Aspect 39: The method of any of Aspects 36-38, wherein the first ACK/NACK feedback is transmitted prior to the other ACK/NACK feedback, and the other ACK/NACK feedback is transmitted prior to the second ACK/NACK feedback.

Aspect 40: The method of any of Aspects 36-39, wherein the at least one of the first ACK/NACK feedback or the second ACK/NACK feedback is to be cancelled when the other ACK/NACK feedback is transmitted prior to the at least one of the first ACK/NACK feedback or the second ACK/NACK feedback.

Aspect 41: The method of any of Aspects 24-40, wherein the first ACK/NACK feedback is associated with a code block group of the packet.

Aspect 42: The method of any of Aspects 24-41, wherein the second ACK/NACK feedback is associated with a code block group of the data.

Aspect 43: The method of any of Aspects 24-42, wherein the second ACK/NACK feedback is associated with at least one of one or more code block groups (CBGs) of the data received as bits or one or more CBGs of the data received as log likelihood ratio values.

Aspect 44: The method of any of Aspects 24-43, wherein the second ACK/NACK feedback is associated with a code block group of the data that is indicated for reporting ACK/NACK feedback.

Aspect 45: The method of any of Aspects 24-44, wherein the second ACK/NACK feedback is associated with a code block group of the data that is received as log likelihood ratio values.

Aspect 46: The method of any of Aspects 24-45, further comprising: receiving, from the first wireless node, information indicating a hybrid automatic repeat request status between the first wireless node and the second wireless node.

Aspect 47: An apparatus for wireless communication at a device, comprising a processor; memory coupled with the processor; and instructions stored in the memory and executable by the processor to cause the apparatus to perform the method of one or more Aspects of Aspects 1-23.

Aspect 48: A device for wireless communication, comprising a memory and one or more processors coupled to the memory, the memory and the one or more processors configured to perform the method of one or more Aspects of Aspects 1-23.

Aspect 49: An apparatus for wireless communication, comprising at least one means for performing the method of one or more Aspects of Aspects 1-23.

Aspect 50: A non-transitory computer-readable medium storing code for wireless communication, the code comprising instructions executable by a processor to perform the method of one or more Aspects of Aspects 1-23.

Aspect 51: A non-transitory computer-readable medium storing a set of instructions for wireless communication, the set of instructions comprising one or more instructions that, when executed by one or more processors of a device, cause the device to perform the method of one or more Aspects of Aspects 1-23.

Aspect 52: An apparatus for wireless communication at a device, comprising a processor; memory coupled with the processor; and instructions stored in the memory and executable by the processor to cause the apparatus to perform the method of one or more Aspects of Aspects 24-46.

Aspect 53: A device for wireless communication, comprising a memory and one or more processors coupled to the memory, the memory and the one or more processors configured to perform the method of one or more Aspects of Aspects 24-46.

Aspect 54: An apparatus for wireless communication, comprising at least one means for performing the method of one or more Aspects of Aspects 24-46.

Aspect 55: A non-transitory computer-readable medium storing code for wireless communication, the code comprising instructions executable by a processor to perform the method of one or more Aspects of Aspects 24-46.

Aspect 56: A non-transitory computer-readable medium storing a set of instructions for wireless communication, the set of instructions comprising one or more instructions that, when executed by one or more processors of a device, cause the device to perform the method of one or more Aspects of Aspects 24-46.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first wireless node, comprising:
receiving, from a second wireless node, first data that is for a third wireless node;
transmitting, to the third wireless node, a first packet that includes information that is based at least in part on partial decoding of the first data;
transmitting a second packet and
receiving, from the third wireless node, at least one of first acknowledgment or negative acknowledgement (ACK/NACK) feedback for the first packet or second ACK/NACK feedback for the first data, wherein:
the at least one of the first ACK/NACK feedback or the second ACK/NACK feedback is to be cancelled based at least in part on transmitting the second packet, or
the second packet includes information that is based at least in part on partial decoding of the first data or second data received from the second wireless node.

2. The method of claim 1, wherein the information that is based at least in part on partial decoding of the first data comprises log likelihood ratio values.

3. The method of claim 1, wherein only the second ACK/NACK feedback is received, and the first ACK/NACK feedback corresponds to the second ACK/NACK feedback.

4. The method of claim 1,
wherein the second packet is transmitted prior to receiving the at least one of the first ACK/NACK feedback or the second ACK/NACK feedback.

5. The method of claim 4, wherein the first packet and the second packet are associated with different hybrid automatic repeat request processes.

6. The method of claim 4, wherein the second packet includes updated information that is based at least in part on partial decoding of the first data, and
wherein the first packet and the second packet are associated with a same hybrid automatic repeat request (HARQ) process.

7. The method of claim 4, wherein the first data is fully decoded by the first wireless node after the first packet is transmitted,
wherein the second packet includes the first data, and
wherein the first packet and the second packet are associated with a same hybrid automatic repeat request process.

8. The method of claim 1, wherein:
the second packet is transmitted, prior to receiving the at least one of the first ACK/NACK feedback or the second ACK/NACK feedback, and
the second packet includes updated information that is based at least in part on partial decoding of the first data.

9. The method of claim 8, further comprising:
receiving, prior to receiving the at least one of the first ACK/NACK feedback or the second ACK/NACK feedback, other ACK/NACK feedback for at least one of the second packet or the first data, wherein the at least one of the first ACK/NACK feedback or the second ACK/NACK feedback is to be cancelled when the other ACK/NACK feedback is received prior to the at least one of the first ACK/NACK feedback or the second ACK/NACK feedback.

10. The method of claim 1, wherein the first ACK/NACK feedback is associated with a code block group of the first packet and the second ACK/NACK feedback is associated with a code block group of the first data.

11. The method of claim 8, further comprising:
receiving, prior to receiving the at least one of the first ACK/NACK feedback or the second ACK/NACK feedback, other ACK/NACK feedback for at least one of the second packet or the first data.

12. A method of wireless communication performed by a first wireless node, comprising:
receiving, from a second wireless node, a first packet that includes information that is based at least in part on partial decoding of first data transmitted to the second wireless node by a third wireless node;
receiving a second packet and
transmitting, to the second wireless node, at least one of first acknowledgment or negative acknowledgement (ACK/NACK) feedback for the first packet or second ACK/NACK feedback for the first data, wherein:
the at least one of the first ACK/NACK feedback or the second ACK/NACK feedback is to be cancelled based at least in part on receiving the second packet, or
the second packet includes information that is based at least in part on partial decoding of the first data or second data transmitted to the second wireless node by the third wireless node.

13. The method of claim 12, wherein the information that is based at least in part on partial decoding of the first data comprises log likelihood ratio values.

14. The method of claim 12, wherein only the second ACK/NACK feedback is transmitted, and the first ACK/NACK feedback corresponds to the second ACK/NACK feedback.

15. The method of claim 12, wherein the
second packet is received prior to transmitting the at least one of the first ACK/NACK feedback or the second ACK/NACK feedback.

16. The method of claim 15, wherein the first packet and the second packet are associated with different hybrid automatic repeat request (HARQ) processes.

17. The method of claim 15, wherein the second packet includes updated information that is based at least in part on partial decoding of the first data, and
wherein the first packet and the second packet are associated with a same hybrid automatic repeat request (HARQ) process.

18. The method of claim 15, wherein the second packet includes the first data, and
wherein the first packet and the second packet are associated with a same hybrid automatic repeat request process.

19. The method of claim 12, wherein:
the second packet is received, prior to transmitting the at least one of the first ACK/NACK feedback or the second ACK/NACK feedback, and
the second packet includes updated information that is based at least in part on partial decoding of the first data.

20. The method of claim 19, further comprising:
transmitting, prior to receiving the at least one of the first ACK/NACK feedback or the second ACK/NACK feedback, other ACK/NACK feedback for at least one of the second packet or the first data, wherein the at least one of the first ACK/NACK feedback or the second ACK/NACK feedback is to be cancelled when the other ACK/NACK feedback is transmitted prior to the at least one of the first ACK/NACK feedback or the second ACK/NACK feedback.

21. The method of claim 12, wherein the first ACK/NACK feedback is associated with a code block group of the first packet and the second ACK/NACK feedback is associated with a code block group of the first data.

22. The method of claim 19, further comprising:
transmitting, prior to transmitting the at least one of the first ACK/NACK feedback or the second ACK/NACK feedback, other ACK/NACK feedback for at least one of the second packet or the first data.

23. A first wireless node for wireless communication, comprising:
a memory; and
one or more processors coupled to the memory, the one or more processors configured to:
receive, from a second wireless node, first data that is for a third wireless node;
transmit, to the third wireless node, a first packet that includes information that is based at least in part on partial decoding of the first data;

transmit a second packet and receive, from the third wireless node, at least one of first acknowledgment or negative acknowledgement (ACK/NACK) feedback for the first packet or second ACK/NACK feedback for the first data, wherein:

the at least one of the first ACK/NACK feedback or the second ACK/NACK feedback is to be cancelled based at least in part on transmitting the second packet, or the second packet includes information that is based at least in part on partial decoding of the first data or second data received from the second wireless node.

24. The first wireless node of claim 23, wherein the information that is based at least in part on partial decoding of the first data comprises log likelihood ratio values.

25. The first wireless node of claim 23, wherein:

the one or more processors are configured to transmit the second packet prior to receiving the at least one of the first ACK/NACK feedback or the second ACK/NACK feedback, and the second packet includes updated information that is based at least in part on partial decoding of the first data.

26. The first wireless node of claim 25, wherein the one or more processors are further configured to:

receive, prior to receiving the at least one of the first ACK/NACK feedback or the second ACK/NACK feedback, other ACK/NACK feedback for at least one of the second packet or the first data.

27. A first wireless node for wireless communication, comprising:

a memory; and one or more processors coupled to the memory, the one or more processors configured to:

receive, from a second wireless node, a first packet that includes information that is based at least in part on partial decoding of first data transmitted to the second wireless node by a third wireless node;

receive a second packet and transmit, to the second wireless node, at least one of first acknowledgment or negative acknowledgement (ACK/NACK) feedback for the first packet or second ACK/NACK feedback for the first data, wherein:

the at least one of the first ACK/NACK feedback or the second ACK/NACK feedback is to be cancelled based at least in part on receiving the second packet, or the second packet includes information that is based at least in part on partial decoding of the first data or second data transmitted to the second wireless node by the third wireless node.

28. The first wireless node of claim 27, wherein the information that is based at least in part on partial decoding of the first data comprises log likelihood ratio values.

29. The first wireless node of claim 27, wherein:

the one or more processors are configured to receive the second packet prior to transmitting the at least one of the first ACK/NACK feedback or the second ACK/NACK feedback, and the second packet includes updated information that is based at least in part on partial decoding of the first data.

30. The first wireless node of claim 29, wherein the one or more processors are further configured to:

transmit, prior to transmitting the at least one of the first ACK/NACK feedback or the second ACK/NACK feedback, other ACK/NACK feedback for at least one of the second packet or the first data.

* * * * *